US010960807B2

(12) United States Patent
Sawada

(10) Patent No.: US 10,960,807 B2
(45) Date of Patent: Mar. 30, 2021

(54) VEHICLE HEAD LIGHT CONTROL APPARATUS

(71) Applicant: TOYOTA JIDOSHA KABUSHIKI KAISHA, Toyota (JP)

(72) Inventor: Tomonari Sawada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/870,296

(22) Filed: May 8, 2020

(65) Prior Publication Data

US 2020/0353858 A1 Nov. 12, 2020

(30) Foreign Application Priority Data

May 9, 2019 (JP) .............................. JP2019-088727

(51) Int. Cl.
*B60Q 1/04* (2006.01)
*B60Q 1/00* (2006.01)
*B60W 60/00* (2020.01)
*G06K 9/00* (2006.01)

(52) U.S. Cl.
CPC ............ *B60Q 1/0023* (2013.01); *B60Q 1/04* (2013.01); *B60W 60/0025* (2020.02); *G06K 9/00201* (2013.01)

(58) Field of Classification Search
CPC ...... B60Q 1/085; B60Q 1/143; B60Q 1/1415; B60Q 1/1423; B60Q 1/1438; B60Q 2300/42; B60Q 2300/45
See application file for complete search history.

(56) References Cited

U.S. PATENT DOCUMENTS

| 7,791,458 B2* | 9/2010 | Shimaoka | B60Q 1/085 340/435 |
| 2008/0225271 A1* | 9/2008 | Ohmura | B60Q 1/085 356/51 |
| 2010/0052550 A1* | 3/2010 | Kobayashi | B60Q 1/143 315/158 |
| 2010/0214791 A1* | 8/2010 | Schofield | B60Q 1/1423 362/466 |

(Continued)

FOREIGN PATENT DOCUMENTS

| JP | 2017177941 A | 10/2017 |
| JP | 2017206196 A | 11/2017 |

(Continued)

*Primary Examiner* — Tung X Le
(74) *Attorney, Agent, or Firm* — Hunton Andrews Kurth LLP

(57) ABSTRACT

A vehicle head light control apparatus controls a lighting apparatus included in a headlight of a vehicle to avoid irradiating to an irradiation avoidance region which is a region overlaps with a detected object. The lighting apparatus can irradiate an irradiation region which is a set of irradiation sections. When the vehicle is in a manual driving state, irradiating to the irradiation sections included in an adjacent region which is a region adjacent to the irradiation avoidance region is reduced as a distance between the irradiation section and the irradiation avoidance region becomes shorter. When the vehicle is in an autonomous driving state, the adjacent region is not provided or the adjacent region becomes smaller as compared with a case where the vehicle is in the manual driving state.

4 Claims, 13 Drawing Sheets

(56) References Cited

U.S. PATENT DOCUMENTS

2016/0114720 A1* 4/2016 Schlaug ................ B60Q 1/085
362/523
2017/0334455 A1   11/2017 Asakura et al.
2018/0304804 A1   10/2018 Tatara et al.

FOREIGN PATENT DOCUMENTS

| JP | 2018024351 A | 2/2018 |
| WO | 2017073632 A1 | 5/2017 |

* cited by examiner (A) Front Image (B) Lighting State of Left High Beam Unit (C) Lighting State of Right High Beam Unit (A) Front Image (B) Lighting State of Left High Beam Unit (C) Lighting State of Right High Beam Unit (A) Front Image (B) Lighting State of Left High Beam Unit (C) Lighting State of Right High Beam Unit

VEHICLE HEAD LIGHT CONTROL APPARATUS

CROSS-REFERENCE TO RELATED APPLICATION

This application claims priority to Japanese Patent Application No. 2019-088727 filed on May 9, 2019, which is incorporated herein by reference in its entirety.

TECHNICAL FIELD

The present disclosure relates to a vehicle head light control apparatus configured to control an irradiation state of a headlight installed on a vehicle.

BACKGROUND

When a vehicle travels at night, it is preferable that a region irradiated by a headlight installed on the vehicle be wide as much as possible such that a driver of the vehicle can recognize (find) an object (for example, another vehicle (an other vehicle) and a pedestrian) on a road promptly. Meanwhile, when an other vehicle is present in the irradiated region of the headlight, there is a high possibility that a driver of the other vehicle may be dazzled (namely, dazzlement (dazzling) will occur to the driver of an other vehicle).

One conventionally known vehicle head light control apparatus (hereinafter, also referred to as the "conventional apparatus") to avoid an occurrence of the dazzlement comprises a lighting apparatus having a plurality of light sources for a headlight. When an object (hereinafter also referred to as the "irradiation avoidance object") which should not be irradiated by the headlight is detected, the conventional apparatus stops light emission of the light source which has been irradiating the irradiation avoidance object. In other words, the conventional apparatus changes (varies) irradiation states (light distribution states) of the headlight in accordance with (based on) a position of the irradiation avoidance object with respect to a vehicle (own vehicle) on which the conventional apparatus is mounted.

Hereinafter, a processing for changing the irradiation states of the headlight so as to avoid irradiating the irradiation avoidance object is also referred to as a "dazzlement avoidance processing (or dazzling preventing process)." For example, the conventional apparatus executes, as the dazzlement avoidance processing, a processing for stopping light emission by the headlight to a region in a frontward direction of the own vehicle when another vehicle (a preceding vehicle) is present (travelling) in the frontward direction (see, for example, Japanese Patent Application Laid-Open (kokai) No. 2017-177941).

SUMMARY

However, if a boundary (brightness boundary) between a "region (irradiation stopped region)" which the headlight stops irradiating and a "region (irradiated region) adjacent to the irradiation stopped region" which the headlight is irradiating is excessively clear (or sharp), a driver of the own vehicle may feel a sense of strangeness. In other words, if a difference in brightness between the irradiation stopped region and the irradiated region is too large (namely, if a gradient of the brightness varies too steeply at the brightness boundary), there is a high possibility that the driver feels the sense of strangeness.

More specifically, when the preceding vehicle described above is present, the brightness boundaries is formed around the preceding vehicle. Namely, in this case, brightness boundaries appear on "a left side, a right side, and a bottom side" of the preceding vehicle. If the brightness boundaries are excessively clear, there is a possibility that the driver of the own vehicle confuses the brightness boundaries with an outer periphery of the preceding vehicle (namely, that the driver misunderstand that the brightness boundaries are the outer periphery of the preceding vehicle). Furthermore, there is also a possibility that the driver concentrates his/her consciousness on the brightness boundaries rather than on the outer periphery of the preceding vehicle. In addition, since the driver can recognize a relative position (vehicle position in the irradiation stopped region) of the preceding vehicle with respect to the irradiation stopped region easily in a case where the brightness boundaries are excessively clear, there is a possibility that the driver feels a sense of strangeness when the vehicle position in the irradiation stopped region varies as time passes (over time).

Therefore, the dazzlement avoidance processing should be executed such that the driver does not feel a sense of strangeness when the brightness boundary appears.

Incidentally, a vehicle whose driving state can be set to an "autonomous driving state" is known. Generally, when an object present in front of a vehicle is detected by a sensor (in-vehicle sensor) mounted on the vehicle, the vehicle is driven (controlled) in accordance with the detected object under the autonomous driving state. In other words, when the driving state is the autonomous driving state, there will be less need for the driver to carefully look at (to pay close attention to) a traveling direction of the vehicle as compared with a case where the driving state is not the autonomous driving state (namely, where the driving state is a "manual driving state").

Therefore, when the driving state is the autonomous driving state, it will be less necessary to consider the driver's sense of strangeness due to the appearance of the brightness boundary. Meanwhile, in order to enable the in-vehicle sensor to detect an object promptly, it is preferable that a deduction/decrease amount (irradiation deduction amount) of an irradiation quantity of the headlight caused by executing the dazzlement avoidance processing be as small as possible.

In view of the forgoing, one object of the present disclosure is to disclose a vehicle head light control apparatus that can reduce a possibility of providing a sense of strangeness to a driver when the driving state is the manual driving state, and to make (let) the irradiation deduction amount relatively smaller when the driving state is the autonomous driving state.

A vehicle head light control apparatus for achieving the above-described object (hereinafter also referred to as "the apparatus of the present disclosure") comprises a headlight, a sensor device, and a control unit. The control unit may be implemented by at least one programmed processor whose operation is determined by a predetermined program, gate arrays and the like.

The headlight (a left high beam unit 55, a right high beam unit 56) includes a lighting apparatus (a left side LED group 57, a right side LED group 58) configured to irradiate an "irradiation region" in front of a vehicle (10), the irradiation region being a set of "irradiation sections" adjacent to each other, and configured to vary irradiation quantity (Bn) for each of the irradiation sections, the irradiation quantity being a lighting amount given to the irradiation section.

The sensor device (a camera apparatus 40, a light control ECU 20) is configured to detect, as an "irradiation avoidance object," an object that is present in the irradiation region and that should not be irradiated by the lighting apparatus.

The control unit (the light control ECU 20) is configured to determine whether or not a predetermined "irradiation condition" is satisfied. In addition, the control unit is configured to execute a "basic irradiation processing" for adjusting an irradiation state such that each of the irradiation quantities is equal to a predetermined standard irradiation quantity (Bs) when the irradiation condition is satisfied and the irradiation avoidance object is not detected. Furthermore, when the irradiation condition is satisfied and the irradiation avoidance object is detected, the control unit is configured to execute a "dazzlement avoidance processing" for adjusting the irradiation state to achieve an "irradiation avoidance state" where the irradiation quantity of the irradiation section overlapping with the irradiation avoidance object is equal to a predetermined "lower limit irradiation quantity" which is lower than the standard irradiation quantity.

In addition, the control unit is configured to determine whether a driving state of the vehicle is a "manual driving state" or an "autonomous driving state". The manual driving state is a state where a travelling state of the vehicle is controlled in accordance with driving operation by a driver of the vehicle. The autonomous driving state is a state where the travelling state is controlled without the driving operation.

The control unit is configured to execute, as the dazzlement avoidance processing, a processing for achieving a "first state" when the driving state is the manual driving state. The first state is a state where both the irradiation avoidance state and a "first specific state" are realized.

The first specific state is a state where the irradiation quantities of the irradiation sections included in a "wide adjacent region" decreases within a range from the lower limit irradiation quantity to the standard irradiation quantity, as a "boundary distance" becomes smaller. The boundary distance is a shortest distance from an outer periphery of an "irradiation avoidance region" that is a set of the irradiation sections overlapping with the irradiation avoidance object. The wide adjacent region is a region that is within the irradiation region under the irradiation avoidance state, adjacent to the irradiation avoidance region and has the boundary distances smaller than a predetermined first distance.

Furthermore, the control unit is configured to execute, as the dazzlement avoidance processing, a processing for achieving a "second state" when the driving state is the autonomous driving state. The second state is one of a state where the irradiation avoidance state is realized and a state where both the irradiation avoidance state and a "second specific state" are realized.

The second specific state is a state where the irradiation quantities of the irradiation sections included in a "narrow adjacent region" decreases within a range from the lower limit irradiation quantity to the standard irradiation quantity, as the boundary distance becomes smaller. The narrow adjacent region is a region that is within the irradiation region under the irradiation avoidance state, adjacent to the irradiation avoidance region, and has the boundary distances smaller than a predetermined second distance which is smaller than the first distance.

In other words, the boundary distance is a shortest distance between the irradiation section and an outer periphery of the irradiation avoidance region. According to the apparatus of the present disclosure, irradiation to the irradiation avoidance object by the lighting apparatus is avoided. In addition, when the driving state of the vehicle is the manual driving state, irradiation to the irradiation section included in the wide adjacent region which is around the irradiation avoidance object gradually increases (or is enhanced) as the distance between the irradiation section and the irradiation avoidance object increases. Namely, the brightness boundary becomes unclear (blurred), and thus, the driver will be more likely to be prevented from feeling a sense of strangeness when the brightness boundary appears. Furthermore, when the driving state is the autonomous driving state, the irradiation deduction amount becomes smaller as compared with a case where the driving state is the manual driving state.

In one aspect of the apparatus of the present disclosure, when the driving state is switched from the autonomous driving state to the manual driving state while the second state has been realized as a result of the dazzlement avoidance processing, the control unit starts a processing for adjusting the irradiation state such that the irradiation state is gradually changed from the second state to the first state over a predetermined first transition time (an irradiation quantity decreased time Td).

According to the present aspect, when the driving state is switched from the autonomous driving state to the manual driving state, a degree of clarity of the brightness boundary gradually varies over/for the first transition time. In other words, when the driver needs more carefully watch (look at) a scene in the traveling direction of the vehicle due to the transition of the driving state to the manual driving state from the autonomous driving state, the clarity of the brightness boundary does not vary quickly (promptly). Accordingly, the possibility of providing a sense of strangeness to the driver remains low.

Furthermore, in the present aspect, when the driving state is switched from the manual driving state to the autonomous driving state while the first state has been realized as a result of the dazzlement avoidance processing, the control unit starts one of a processing for adjusting the irradiation state such that the irradiation state is gradually changed from the first state to the second state over a predetermined second transition time (a transition time Tf) which is shorter than the first transition time, and a processing for adjusting the irradiation state such that the irradiation state is immediately changed from the first state to the second state.

In this case, when the driving state is switched from the manual driving state to the autonomous driving state, it is possible to quickly realize a state where the irradiation deduction amount is smaller as compared with a case in which the driving state is the manual driving state.

In another mode of the apparatus of the present disclosure, the lighting apparatus is configured such that the irradiation sections are arranged in line in front of the vehicle in a width direction of the vehicle.

For example, the lighting apparatus may be configured by arranging LED chips, which are light source, on a substrate in line in the width direction of the vehicle. In this case, a region to which each of the LED chips irradiates is the irradiation section. According to this aspect, the irradiation quantity of the irradiation section can be adjusted by means of controlling a light emitting amount of the LED chip corresponding to that irradiation section.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION (Configuration)

Figure 1:
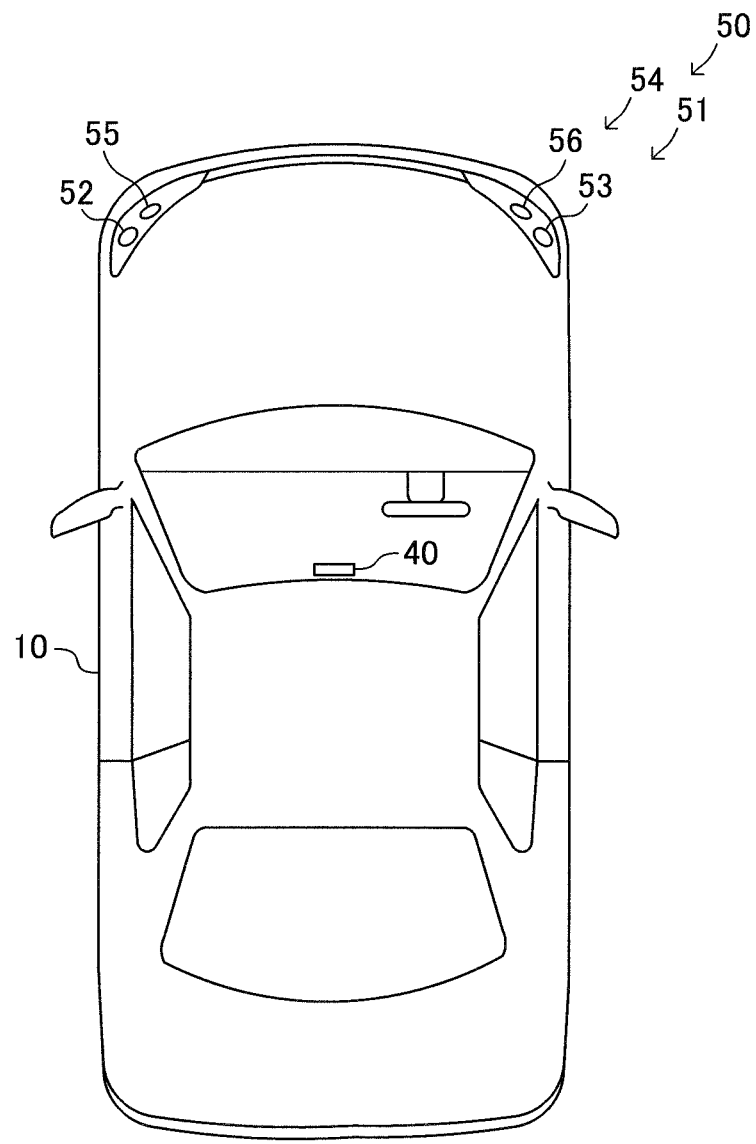
FIG. 1 is a schematic diagram of a vehicle (present vehicle) on which a vehicle head light control apparatus according to an embodiment of the present disclosure (present control apparatus) is mounted.

A vehicle head light control apparatus according to an embodiment of the present disclosure (hereinafter also referred to as the "present control apparatus") will now be described with reference to the drawings. The present control apparatus is applied to a vehicle 10 shown in FIG. 1. As understood from FIG. 2 illustrating a block diagram of the present control apparatus, the present control apparatus includes a light control ECU 20 and a drive control ECU 30 each of which is an electronic control unit (ECU), a camera apparatus 40, and a headlight 50. Each of the light control ECU 20, the drive control ECU 30, and the camera apparatus 40 can perform data communication (can exchange data) with one another through a CAN (controller area network) 31.

(Configuration—Camera Apparatus)

The camera apparatus 40 is disposed at a position on a cabin side of a front windshield of the vehicle 10 near an unillustrated inner rear-view mirror (a room mirror) fixed at a center upper portion of the front windshield. The camera apparatus 40 includes an image obtaining section 41 and an image processing section 42. The image obtaining section 41 obtains (captures) an image of a region in front of the vehicle 10 as a "front image" every time a predetermined time interval $\Delta Tc$ elapses, and outputs data (namely, static image data) representing the front image to the image processing section 42.

The image processing section 42 detects (extracts) objects contained in the front image by means of a well-known method (in the present embodiment, a template matching method) from the front image. The objects detected by the image processing section 42 are, for example, a vehicle (hereinafter also referred to as the "other vehicle") other than the vehicle 10, and a pair of lane separation lines (i.e., lane markers) defining a lane (hereinafter also referred to as the "own lane") in which the vehicle 10 is traveling. In addition, the image processing section 42 obtains (estimates) positions of the detected objects (relative positions with respect to the vehicle 10) by means of a well-known method based on the front image.

Figure 3:
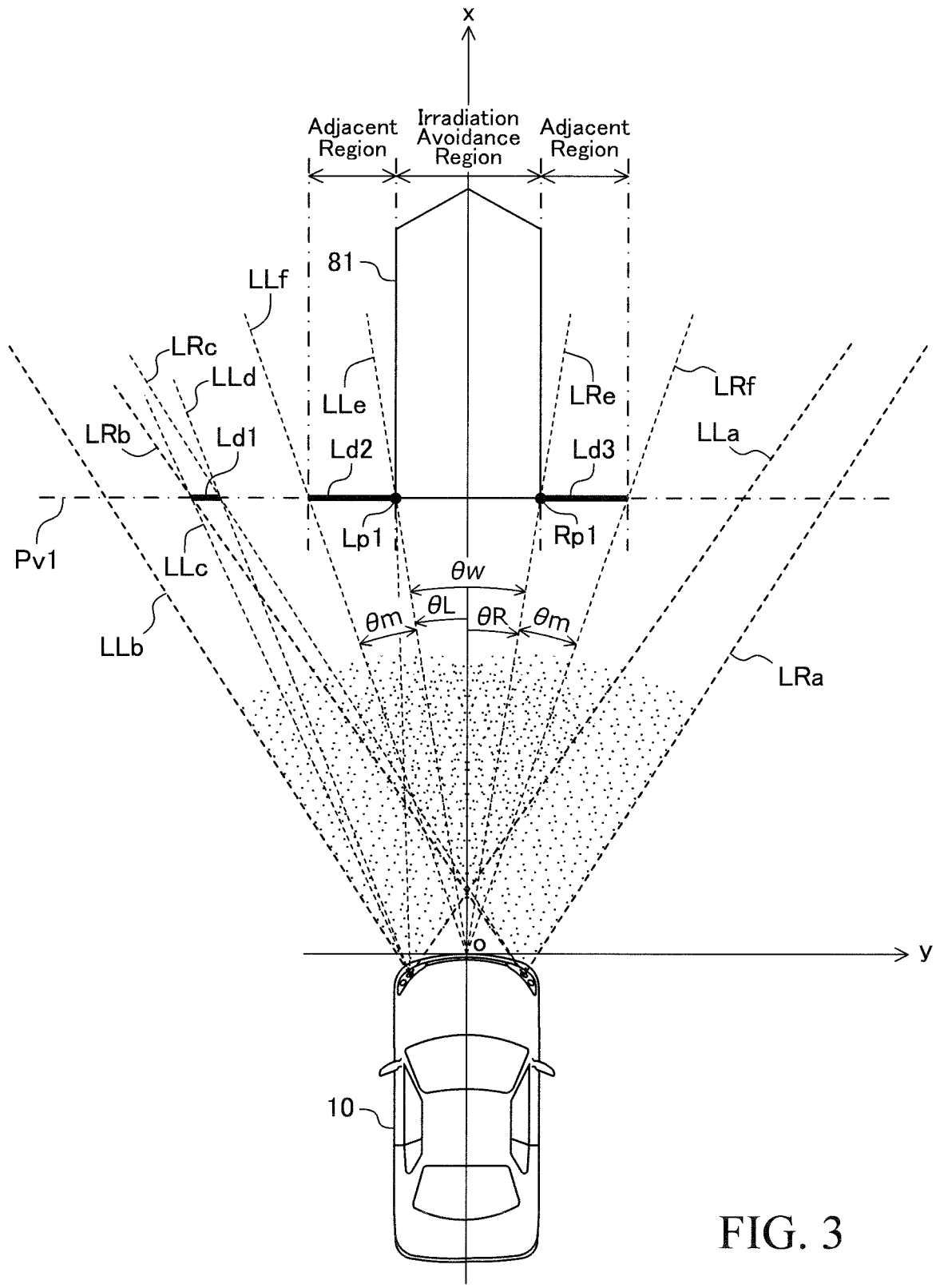
FIG. 3 is a plan view showing a region in which an irradiation quantity is reduced as a result of a dazzlement avoidance processing executed by the present control apparatus.

The position of the detected object obtained by the image processing section 42 will be described in detail. As shown in FIG. 3, in the present embodiment, an x-y coordinate system having the origin which is the center of the front end of the vehicle 10 in the width direction (lateral direction) of the vehicle 10 is used (introduced). An axis which extends in the longitudinal direction of the vehicle 10 is defined as an x coordinate axis, and an axis which extends in lateral direction (width direction) of the vehicle 10 is defined as a y coordinate axis. The x coordinate axis and the y coordinate axis are orthogonal to each other. The x coordinate assumes a positive value on one side of the origin toward the forward direction of the vehicle 10 and assumes a negative value on the other side of the origin toward the backward direction of the vehicle 10. The y coordinate assumes a positive value on the right side with respect to the heading direction of the vehicle 10 moving forward and assumes a negative value on the left side with respect to the heading direction of the vehicle 10 moving forward.

When an other vehicle is detected as an object, the image processing section 42 obtains "other vehicle position information" and "other vehicle lighting state information." Subsequently, the image processing section 42 transmits the other vehicle position information and the other vehicle lighting state information to the ECU 20 via the CAN 31. Furthermore, the image processing section 42 transmits the other vehicle position information to the drive control ECU 30 via the CAN 31.

The other vehicle position information includes x-y coordinate vales of each of the left end and the right end of the other vehicle contained in the front image. In the example shown in FIG. 3, a point Lp1 is a left end (leftmost portion) of an other vehicle 81 and a point Rp1 is a right end (rightmost portion) of the other vehicle 81. The other vehicle lighting state information includes a determination result of whether or not the other vehicle is in a state where at least one of a headlight and a taillight of the other vehicle is on (i.e., lighting on, or being turned-on).

Meanwhile, when a pair of lane separation lines (namely, a left separation line and a right separation line) of the own lane are detected (as objects which are road surface markings in this case), the image processing section 42 obtains "lane position information" and transmits the lane position information to the drive control ECU 30 via the CAN 31. The lane position information includes positions of the left and right separation lines with respect to the vehicle 10. The position of each of the separation lines is represented by a set of combinations of an x coordinate value in a range of x>0 and a y coordinate value for that x coordinate value.
(Configuration—Headlight)

The headlight 50 includes a low beam unit 51 and a high beam unit 54. The low beam unit 51 includes a left low beam unit 52 and a right low beam unit 53. The high beam unit 54 includes a left high beam unit 55 and a right high beam unit 56.

Figure 2:
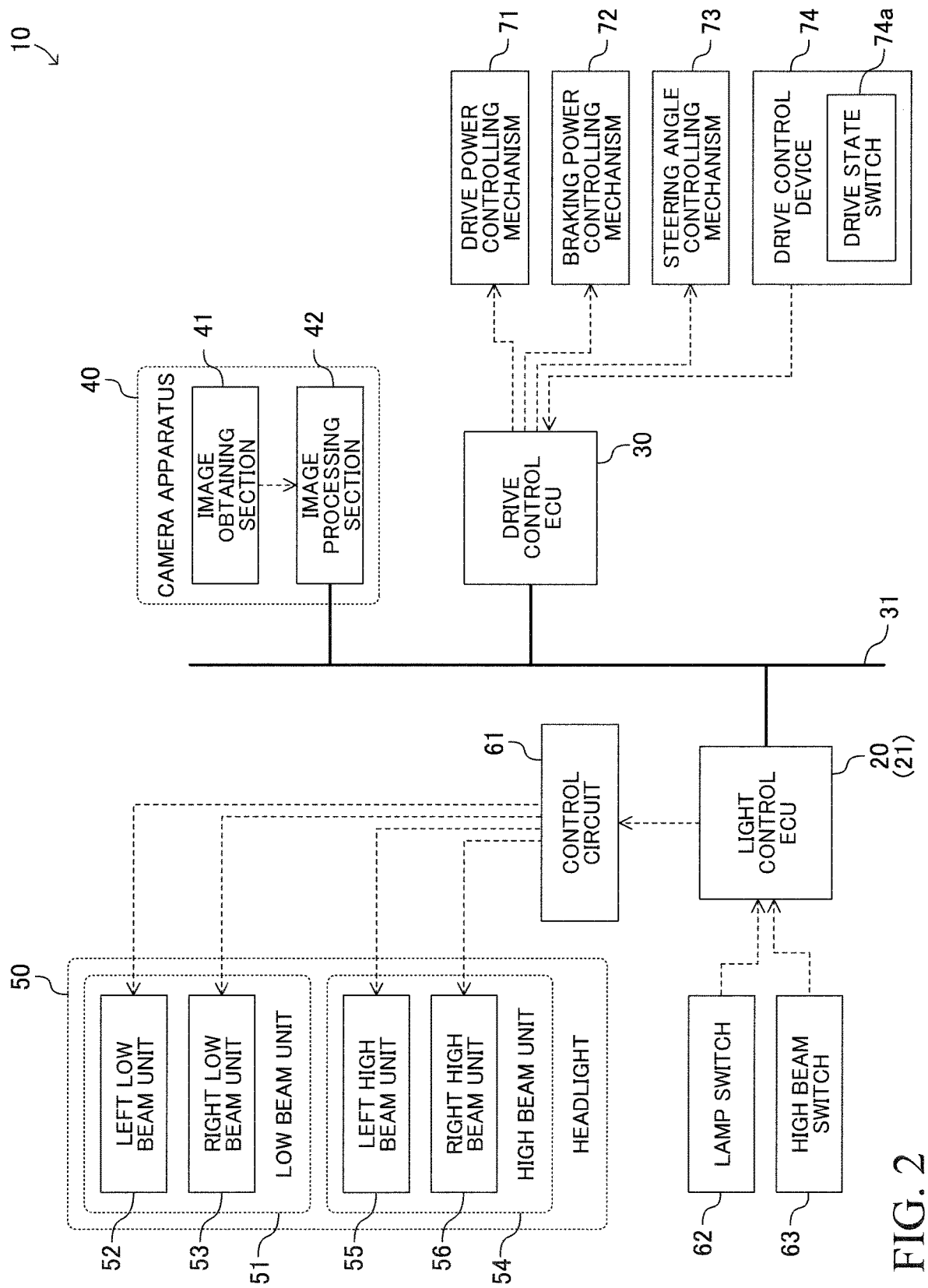
FIG. 2 is a block diagram of the present control apparatus.

As shown in FIG. 1, the left low beam unit 52 and the left high beam unit 55 are mounted on a left front part of the vehicle 10. The right low beam unit 53 and the right high beam unit 56 are mounted on a right front part of the vehicle 10. Each of the left high beam unit 55 and the right high beam unit 56 is also referred to as a "lighting apparatus" for convenience' sake.

Hereinafter, a state (specifically, an irradiation state of the headlight 50) where the low beam unit 51 (namely, each of the left low beam unit 52 and the right low beam unit 53) is on (being turned on) and the high beam unit 54 (namely, the left high beam unit 55 and the right high beam unit 56) is off (being turned off) will also be referred to as a "low beam state" for convenience' sake. Meanwhile, a state where both the low beam unit 51 and the high beam unit 54 are on will also be referred to as a "high beam state" for convenience' sake.

The low beam unit 51 is configured to irradiate a predetermined "low beam light distribution region" which is a region on a road (ground) and relatively close to the vehicle 10. In an image 91a shown in (A) of FIG. 4 which is an example of the front image, a low beam region RL is the low beam light distribution region, which the low beam unit 51 irradiates.

The high beam unit 54 is configured to irradiate a predetermined "high beam light distribution region" which is positioned above (or farther than) the low beam light distribution region. In the image 91a of (A) of FIG. 4, a high beam region RH is the high beam light distribution region, which the high beam unit 54 irradiates. The high beam light distribution region is also referred to as an "irradiation region" for convenience' sake.

Figure 4:
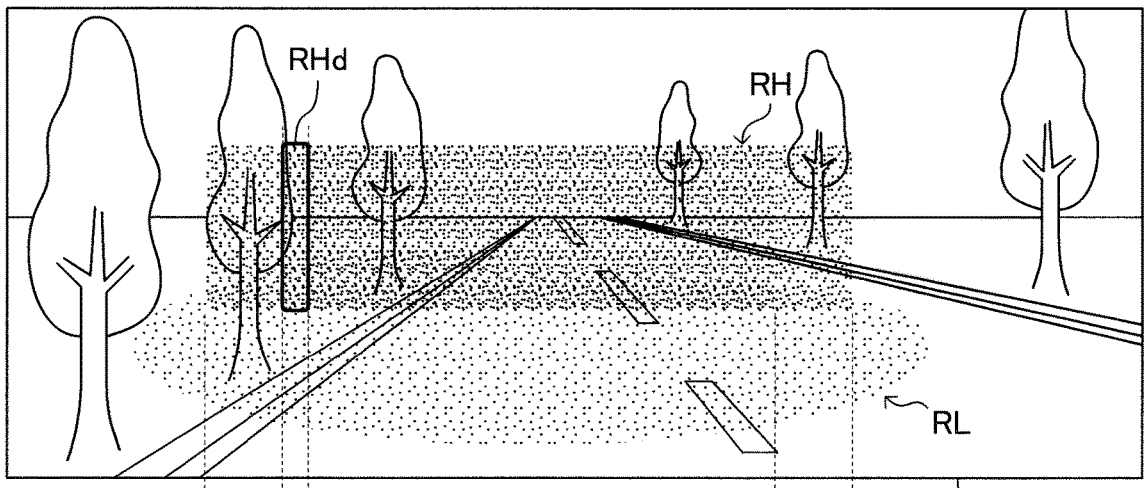
FIG. 4 is for describing irradiation sections and includes (A), (B), and (C), where (A) is an example of an image (front image) of a region in front of the present vehicle, and (B) and (C) are histograms showing irradiation states of a left high beam unit and a right high beam unit.
Figure 4:
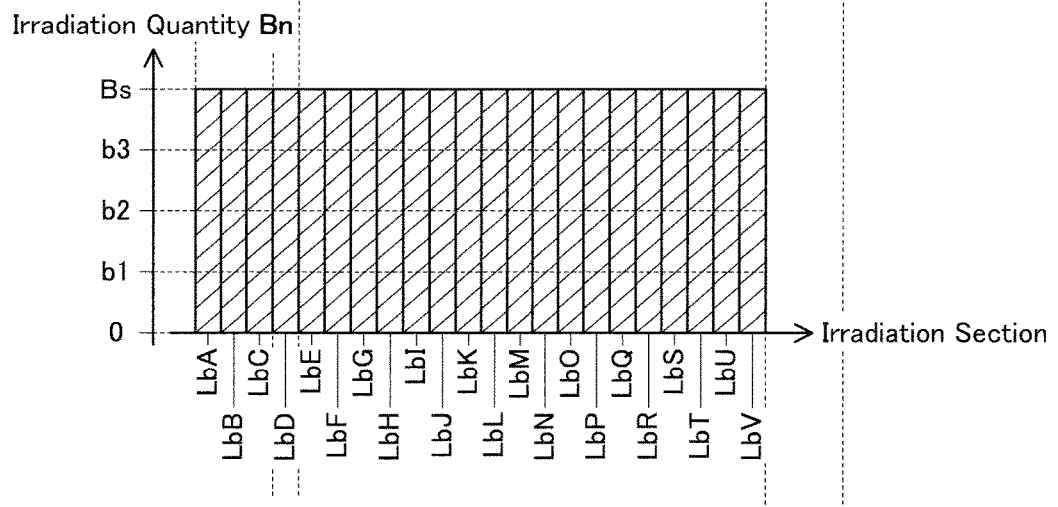
Figure 4:
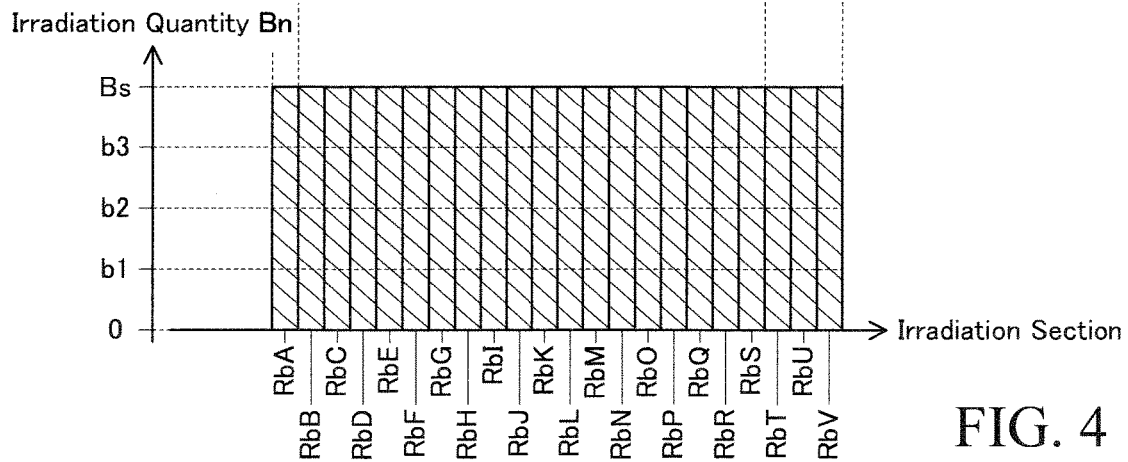

The high beam region RH shown in (A) of FIG. 4 is a region irradiated by the high beam unit 54 on a vertical plane including a straight line which is a dashed-dotted line Pv1 in FIG. 3, the line Pv1 passing through the point Lp1 and the point Rp1. This vertical plane is orthogonal to a plane including both the x coordinate and the y coordinate, and includes the line Pv1. A vertical plane which includes the left end (position) and the right end (position) of an other vehicle is referred to as a "light distribution vertical plane." The left end (position) and the right end (position) of the other vehicle is included in the other vehicle position information sent from the camera apparatus 40.

The high beam light distribution region and a structure (configuration) of the high beam unit 54 will be described. In a planar view (top view) shown in FIG. 3, a region irradiated by the left high beam unit 55 has an angle formed between a broken line LLa and a broken line LLb. Similarly, a region irradiated by the right high beam unit 56 has an angle formed between a broken line LRa and a broken line LRb in FIG. 3.

A part of the high beam light distribution region irradiated by the left high beam unit 55 is referred to as a "left high beam light distribution region." Similarly, a part of the high beam light distribution region irradiated by the right high beam unit 56 is referred to as a "right high beam light distribution region." As understood from FIG. 3, a part of the left high beam light distribution region and a part of the right high beam light distribution region overlap with each other.

Figure 5A:
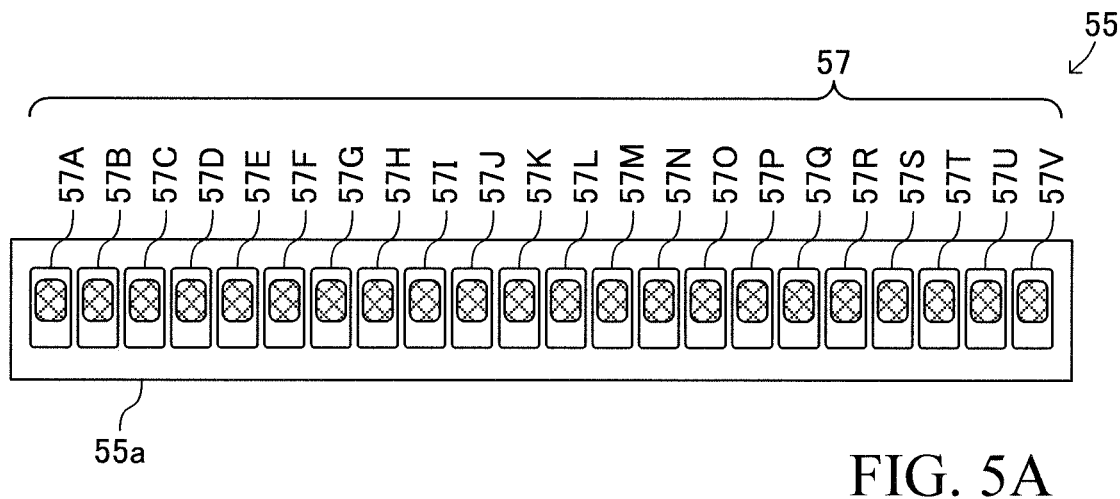
FIG. 5A is a diagram illustrating a left side LED group included in the left high beam unit.
Figure 5B:
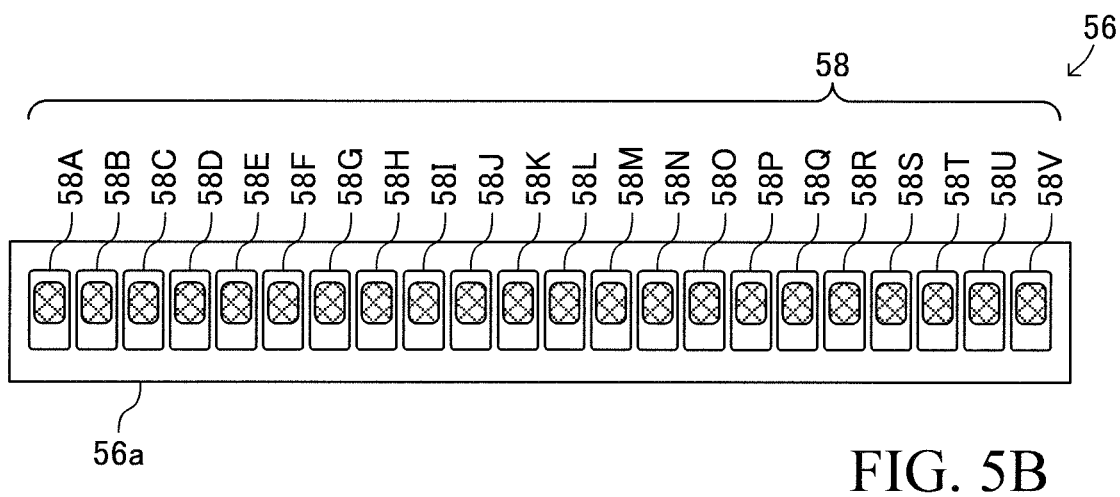
FIG. 5B is a diagram illustrating a right side LED group included in the right high beam unit.

As shown in FIG. 5A, the left high beam unit 55 includes a substrate 55a on which twenty two LED chips (specifically, a left side LED 57A to a left side LED 57V, which are also referred to as a left side LED group 57 collectively) are arranged in line (in a straight-line fashion) at equal intervals. Similarly, as shown in FIG. 5B, the right high beam unit 56 includes a substrate 56a on which twenty two LED chips (specifically, a right side LED 58A to a right side LED 58V, which are also referred to as a "right side LED group 58" collectively) are arranged in line at equal intervals.

A region which is irradiated by each of the LED chips included in the left side LED group 57 and the right side LED group 58 is referred to as a "irradiation section" for convenience' sake. Therefore, the left high beam light distribution region is an aggregation (or set, or group) of the irradiation sections of each of the left side LED group 57, and the right high beam light distribution region is an aggregation of the irradiation sections of each of the right side LED group 58.

The irradiation sections will be described more specifically with reference to histograms shown in (B) and (C) of FIG. 4. Each of a bin LbA to a bin LbV in the histogram of (B) of FIG. 4 represents an amount/quantity of light (which is also referred to as an irradiation quantity Bn) from each one of left side LED group 57 to the corresponding irradiation section. Each of a bin RbA to a bin RbV in the histogram of (C) of FIG. 4 represents the irradiation quantity Bn of each one of the right side LED group 58.

When the irradiation state of the headlight 50 is the high beam state and "the dazzlement avoidance processing" described later is not being executed, the irradiation quantity Bn of each of the left side LED group 57 and each of the right side LED group 58 is equal to a predetermined standard irradiation quantity Bs.

In the present embodiment, each of the irradiation sections of the left side LED group 57 and the right side LED group 58 appears approximately as a vertically long rectangular area in/on the light distribution vertical plane. In addition, the irradiation sections of the left side LED group 57 are adjacent to each other and aligned in the width direction of the vehicle 10. Similarly, the irradiation sections of the right side LED group 58 are adjacent to each other and aligned in the width direction of the vehicle 10.

For example, a region RHd shown in (A) of FIG. 4 is the irradiation section corresponding to the left side LED 57D of the left high beam unit 55 and the irradiation section corresponding to the right side LED 58A of the right side LED group 58. The irradiation quantity Bn of the left side LED 57D is represented by a height of the bin LbD in (B) of FIG. 4. The irradiation quantity Bn of the right side LED 58A is represented by a height of the bin RbA in (C) of FIG. 4.

The irradiation sections of the left side LED 57D and the right side LED 58A is represented by a heavy line Ld1 in FIG. 3. In other words, the irradiation section of the left side LED 57D corresponds to (or is represented by) an angle formed between a broken line LLc and a broken line LLd shown in FIG. 3. Similarly, the irradiation section of the right side LED 58A corresponds to (or is represented by) an angle formed between a broken line LRb and a broken line LRc.

(Configuration—Light Control ECU)

The light control ECU 20 includes a micro-computer, as a major component, which has a CPU, a non-volatile memory, and a RAM. The CPU performs data reading, numerical computation, computation result output, or the like, by repeatedly executing predetermined programs (routines). The non-volatile memory formed by a ROM and a flash memory stores the programs executed by the CPU, lookup tables (maps) read by the CPU during execution of the programs, and the like. The RAM temporarily stores data read by the CPU.

As shown in FIG. 2, the light control ECU 20 is connected to a control circuit 61, a lamp switch 62, and a high beam switch 63. The control circuit 61 controls electrical power supplied from a battery (not shown) to the headlight 50 in response to an instruction from the light control ECU 20. Namely, the light control ECU 20 controls the control circuit 61 so as to adjust/changes the irradiation states (lighting states) of the headlight 50.

In the present embodiment, the control circuit 61 controls the irradiation quantities Bn of each of the left side LED group 57 and each of the right side LED group 58 by means of well-known PWM light control. Namely, the control circuit 61 controls the irradiation quantity Bn of a certain LED chip by adjusting/varying a ratio (namely, a duty ratio) of "a length of time during which voltage is applied to that LED chip in a unit time" to "the unit time".

Each of the lamp switch 62 and the high beam switch 63 is disposed at appropriate position such that each of the switches can be operated by a driver of the vehicle 10. Operating states of each of the lamp switch 62 and the high beam switch 63 are switched between an "ON state" and an "OFF state" in response to predetermined operations by the driver of the vehicle 10.

When the operating state of the lamp switch 62 is the ON state and the operating state of the high beam switch 63 is the OFF state, the light control ECU 20 determines that a "low beam condition" is satisfied. When the low beam condition is satisfied, the light control ECU 20 controls the control circuit 61 such that the irradiation state of 50 is kept at/in the low beam state.

Meanwhile, when the operating states of both the lamp switch 62 and the high beam switch 63 are the ON state, the light control ECU 20 determines that a "high beam condition" is satisfied. When the high beam condition is satisfied, the light control ECU 20 controls the control circuit 61 such that the irradiation state of 50 is kept at/in the high beam state. The high beam condition is also referred to as an "irradiation condition" for convenience' sake.

(Configuration—Drive Control ECU)

The drive control ECU 30 shown in FIG. 2, similarly to the light control ECU 20, includes a micro-computer as a major component. The drive control ECU 30 is connected to a drive power controlling mechanism 71, a braking power controlling mechanism 72, a steering angle controlling mechanism 73, and a drive control device 74.

The drive power controlling mechanism 71 includes an engine, which is a drive power source of the vehicle 10, and a transmission. The braking power controlling mechanism 72 includes a hydraulic brake apparatus for generating brake force on each of wheels of the vehicle 10. The drive control ECU 30 is configured to control the drive power controlling mechanism 71 and the braking power controlling mechanism 72 so as to control an acceleration of the vehicle 10 (including a negative value of the acceleration, namely, a deceleration).

The steering angle controlling mechanism 73 includes a steering mechanism (turning mechanism) for adjusting/varying a turning angle of steered wheels (namely, front wheels) of the vehicle 10 and an electrical motor for generating torque to vary the turning angle. The drive control ECU 30 is configured to control the steering angle controlling mechanism 73 so as to control the turning angle of the vehicle 10.

The drive control device 74 includes an accelerator pedal, a brake pedal, a steering wheel, a shift lever, and a drive state switch 74a. An operating states of the drive state switch 74a is switched between an "ON state" and an "OFF state" in response to predetermined operations of the driver.

When the operating state of the drive state switch 74a is the ON state and a predetermined "autonomous driving condition" is satisfied, the drive control ECU 30 executes an "autonomous driving processing." The autonomous driving condition is satisfied at least when the camera apparatus 40 has detected the position of the own lane (specifically, the drive control ECU 30 has received the lane position information from the camera apparatus 40). Namely, when the drive control ECU 30 has not received the lane position information from the camera apparatus 40, the autonomous driving condition is not satisfied.

In the present embodiment, the autonomous driving processing is a processing to control the drive power controlling mechanism 71, the braking power controlling mechanism 72 and the steering angle controlling mechanism 73 such that the vehicle 10 can keep traveling (running) in/along the own lane without driving operation by the driver. More specifically, the drive control ECU 30 determines whether or not a preceding vehicle is present based on the other vehicle position information received from the image processing section 42. The preceding vehicle is a vehicle which is located/traveling ahead of the vehicle 10 in the own lane and within a predetermined distance threshold from the vehicle 10.

When the preceding vehicle is determined to be present, the drive control ECU 30 controls the drive power controlling mechanism 71 and the braking power controlling mechanism 72 so as to control the acceleration of the vehicle 10 such that the distance between the preceding vehicle and the vehicle 10 coincides with a target inter-vehicle distance set by a predetermined operation of the driver. Meanwhile, when a preceding vehicle is not determined to be present, the drive control ECU 30 controls the drive power controlling mechanism 71 and the braking power controlling mechanism 72 such that a traveling (running) speed of the vehicle 10 coincides with a target speed set by a predetermined operation of the driver.

In addition, the drive control ECU 30 controls the steering angle controlling mechanism 73 to thereby adjust the turning angle of the vehicle 10 such that the vehicle 10 keeps traveling (running) in the own lane.

When the operating state of the drive state switch 74a is the OFF state, the drive control ECU 30 does not execute the autonomous driving processing. In addition, when the autonomous driving condition is not satisfied, the drive control ECU 30 does not execute the autonomous driving processing regardless of the operating state of the drive state switch 74a. Namely, in these cases, the driver operates the drive control device 74 so as to drive the vehicle 10.

Hereinafter, a state (namely, a driving state of the vehicle 10) where the drive control ECU 30 is executing the autonomous driving processing will be referred to as an "autonomous driving state." Meanwhile, a state where the drive control ECU 30 is not executing the autonomous driving processing (namely, a state where the driver drives the vehicle 10 by operating the drive control device 74) will be referred to as a "manual driving state." When the driving states of the vehicle 10 is switched between the autonomous driving state and the manual driving state, the drive control ECU 30 transmits a "driving state notification" to the light control ECU 20 via the CAN 31 so as to notify the light control ECU 20 of the driving state of the vehicle 10 (namely, of either the autonomous driving state or the manual driving state).

(Dazzlement Avoidance/Dazzling Prevention Processing)

Next, the dazzlement avoidance processing which is executed by the drive control ECU 30 will be described. When "the irradiation avoidance object" is present (detected) in the high beam light distribution region while the irradiation state of the headlight 50 is the high beam state, the light control ECU 20 executes the dazzlement avoidance processing. The irradiation avoidance object is an object which should not be irradiated by the high beam unit 54. In the present embodiment, the irradiation avoidance object is an other vehicle of which at least one of a headlight and a taillight of is turned on. The light control ECU 20 determines whether or not the irradiation avoidance object is present in the high beam light distribution region on the basis of the other vehicle position information and the other vehicle lighting state information the light control ECU 20 receives from the image processing section 42.

The dazzlement avoidance processing will be described more specifically. When the driving state of the vehicle 10 is the autonomous driving state, the light control ECU 20 executes a "narrow area irradiation reduction processing" as the dazzlement avoidance processing. When the driving state of the vehicle 10 is the manual driving state, the light control ECU 20 executes a "wide area irradiation reduction processing" as the dazzlement avoidance processing. The light control ECU 20 determines the driving state of the vehicle 10 on the basis of the received driving state notification sent from the drive control ECU 30.

(Narrow Area Irradiation Reduction Processing as Dazzlement Avoidance Processing)

The narrow area irradiation reduction processing is a processing to reduce the irradiation quantity Bn of the LED chips that irradiate the irradiation avoidance object down to a "lower limit irradiation quantity." The LED chip whose irradiation quantity Bn is reduced to the lower limit irradiation quantity through the narrow area irradiation reduction processing may sometimes be referred to as an "irradiation stopping chip." The lower limit irradiation quantity is an irradiation quantity which is less than the standard irradiation quantity Bs. In the present embodiment, the lower limit irradiation quantity is "0." A set of the irradiation sections corresponding to the irradiation stopping chips is referred to as an "irradiation avoidance region" for convenience' sake. A state where the irradiation quantity Bn of the irradiation stopping chip is equal to the lower limit irradiation quantity is referred to as an "irradiation avoidance state" or a "second state," for convenience' sake.

Figure 6:
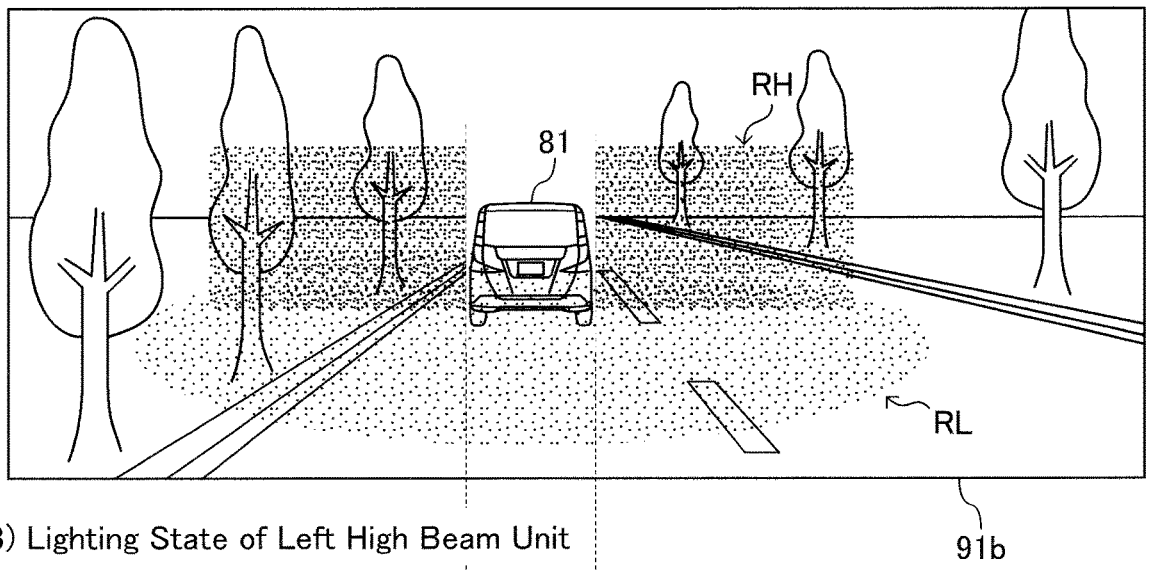
FIG. 6 is for describing irradiation sections and includes (A), (B), and (C), where (A) is an example of the front image, and (B) and (C) are histograms showing the irradiation states in a case where a narrow area irradiation reduction processing is being executed.
Figure 6:
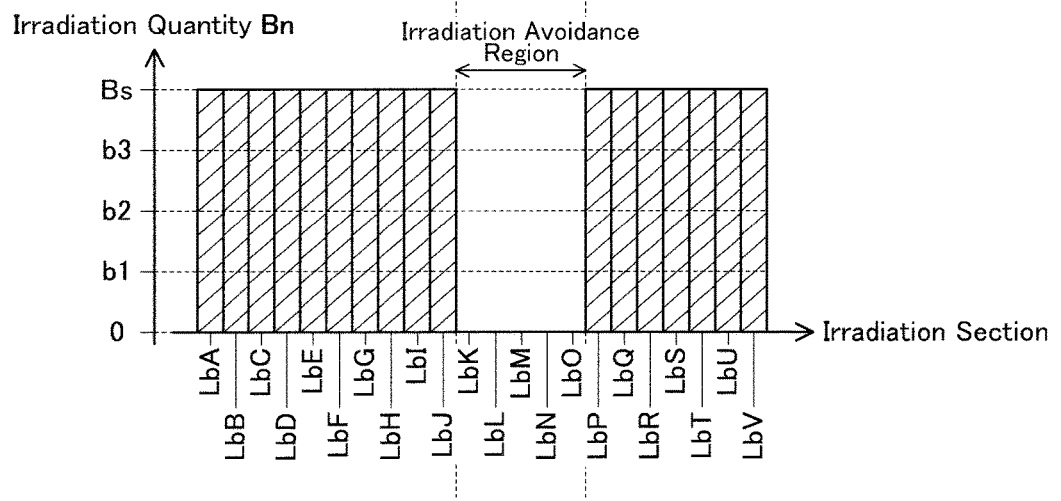
Figure 6:
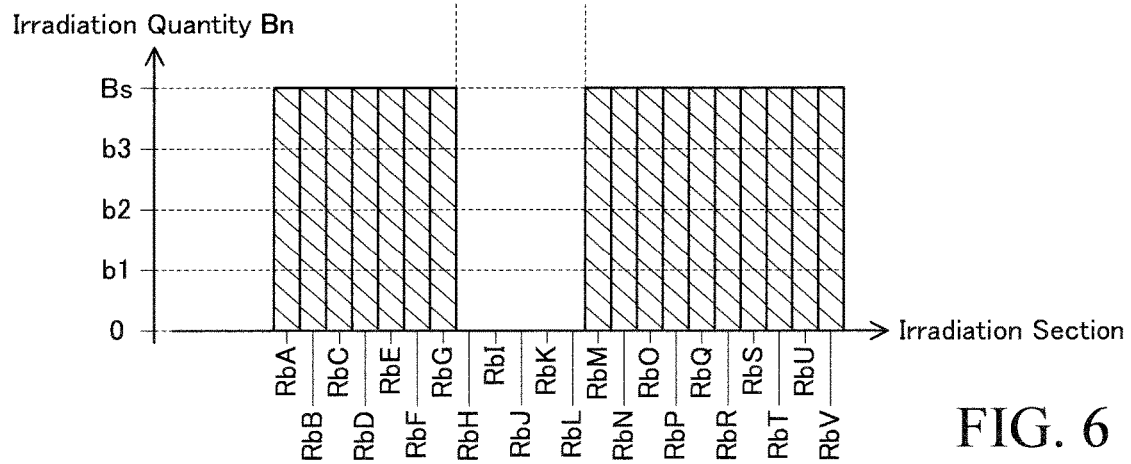

Circumstances where the narrow area irradiation reduction processing is being executed are shown in (A) to (C) of FIG. 6. An image 91b shown in (A) of FIG. 6 is an example of the front image. The image 91b is different from the image 91a described above (see (A) of FIG. 4) only in that the other vehicle 81 (also shown in FIG. 3) is present, and thus, the irradiation quantities Bn of the high beam unit 54 are changed. In this example, the other vehicle 81 is the irradiation avoidance object, since the taillight of the other vehicle 81 shown in the image 91b is on.

The histogram shown in (B) of FIG. 6 represents the irradiation state of the left high beam unit 55 (specifically, the left side LED group 57) in the case corresponding to the case shown in (A) of FIG. 6. The histogram shown in (C) of FIG. 6 represents the irradiation state of the right high beam unit 56 (specifically, the right side LED group 58) in the case corresponding to the case shown in (A) of FIG. 6. As understood from (B) of FIG. 6, the irradiation quantities Bn of the LED chips corresponding to the bin LbK to the bin LbO (namely, the left side LED 57K to the left side LED 57O) are "0". Similarly, as understood from (C) of FIG. 6, the irradiation quantities Bn of the LED chips corresponding to the bin RbH to the bin RbL (namely, the right side LED 58H to the right side LED 58L) are "0".

Namely, in this example, the left side LED 57K to the left side LED 57O and the right side LED 58H to the right side LED 58L are the irradiation stopping chips. As a result, as understood from (A) of FIG. 6, irradiation of light by the high beam unit 54 to the other vehicle 81 which is the irradiation avoidance object is avoided/stopped. The irradiation avoidance region of this example is represented by a line segment from the point Lp1 to the point Rp1 in FIG. 3.

To summarize the above description, the narrow area irradiation reduction processing is a processing in which following processes (a) to (e) are sequentially executed. If the light control ECU 20 has received the other vehicle position information and the other vehicle lighting state information related to a plurality of other vehicles from the camera apparatus 40, the light control ECU 20 executes the process (a) to (d) for each of the other vehicles respectively. For example, assuming that there is a case where two irradiation avoidance objects are present, two irradiation avoidance regions are formed, or a single relatively large/wide irradiation avoidance region is formed.

(a): a process, on the basis of the received position of an other vehicle identified by the other vehicle position information sent from the camera apparatus 40, to determine whether or not the other vehicle is present in the high beam light distribution region;

(b): a process, when it is determined that the other vehicle is present in the high beam light distribution region through the process (a), to determine whether or not at least one of the headlight and the taillight of that other vehicle is on, on the basis of the received other vehicle lighting state information sent from the camera apparatus 40;

(c): a process, when it is determined that at least one of the headlight and the taillight of the other vehicle is on through the process (b), to determine that the other vehicle is the irradiation avoidance object and to extract (determine) the irradiation stopping chips corresponding to that irradiation avoidance object from among each of the left side LED group 57 and the right side LED group 58;

(d): a process to set the irradiation quantities Bn of those irradiation stopping chips extracted through the process (c) to "0";

(e): a process to set the LED chips of the left side LED group 57 and the right side LED group 58 (namely, "residual irradiation chips" described later) other than those irradiation stopping chips extracted through the process (c) to the standard irradiation quantity Bs.

(Wide Area Irradiation Reduction Processing as Dazzlement Avoidance Processing)

The wide area irradiation reduction processing is a processing to reduce the irradiation quantity Bn of the LED chips corresponding to a pair of "wide adjacent regions" to a value less than the standard irradiation quantity Bs. The LED chip whose irradiation quantity Bn is reduced from the standard irradiation quantity Bs through the wide area irradiation reduction processing may sometimes be referred to as an "irradiation reduction chip." The wide adjacent regions are regions adjacent to the left side and the right side of the irradiation avoidance region. In the following description according to the present embodiment, the wide adjacent region is also referred to as an "adjacent region" for simplification.

The adjacent region is defined on the basis of an adjacent region angle θm. A method to determine the adjacent region angle θm, a method to determine the adjacent region based on the adjacent region angle θm, and a method to determine the irradiation quantity Bn of each of the irradiation reduction chips will be described below.

The adjacent region angle θm of the irradiation avoidance object is calculated by multiplying a region angle θw by a predetermined constant α (namely, θm=α×θw). The region angle θw is the difference between a right end angle θR and a left end angle θL described later (namely, θw=θR−θL). The constant α falls within a range of "0" to "1" (namely, 0<α<1).

The left end angle θL is an angle formed between the x coordinate axis and a straight line (left end straight line) which extends from the origin of the x-y coordinate to the left end of the irradiation avoidance object (namely, the other vehicle) identified by the other vehicle position information (refer to FIG. 3). The right end angle θR is an angle formed between the x coordinate axis and a straight line (right end straight line) which extends from the origin of the x-y coordinate to the right end of the irradiation avoidance object identified by the other vehicle position information (refer to FIG. 3).

In FIG. 3, a broken line LLe is the left end straight line of the other vehicle 81, and a broken line LRe is the right end straight line of the other vehicle 81. In addition, the left end angle θL and the right end angle θR of the other vehicle 81, and the region angle θw are shown in FIG. 3.

Notably, in the present embodiment, an angle between the x coordinate axis and a straight line extending from the origin to a region where x>0 and y>0 is a positive value. Meanwhile, an angle between the x coordinate axis and a straight line extending from the origin to a region where x>0 and y<0 is a negative value. Therefore, in the example of FIG. 3, the left end angle θL is a negative value and the right end angle θR is a positive value (namely, θw=θR−θL=θR+|θL|).

The adjacent region which is adjacent to the left end of the irradiation avoidance region is represented by a segment line (hereinafter also referred to as a "left side segment line") which extends from an "intersection point between the light distribution vertical plane in a planar view and the left end straight line" to an "intersection point between the light distribution vertical plane in a planar view and a left side adjacent region line." The left side adjacent region line is a straight line which extends from the vehicle 10 to the left side of the left end straight line such that an angle formed between the left side adjacent region line and the x coordinate axis is less than an angle formed between the left end straight line and the x coordinate axis by the adjacent region angle θm.

The adjacent region which is adjacent to the right end of the irradiation avoidance region is represented by a segment line (hereinafter also referred to as a "right side segment line") which extends from an "intersection point between the light distribution vertical plane in a planar view and the right end straight line" to an "intersection point between the light distribution vertical plane in a planar view and a right side adjacent region line." The right side adjacent region line is a straight line which extends from the vehicle 10 to the right side of the right end straight line such that an angle formed between the right side adjacent region line and the x coordinate axis is more than an angle formed between the right end straight line and the x coordinate axis by the adjacent region angle θm.

In FIG. 3, a broken line LLf is the left side adjacent region line, and a broken line LRf is the right side adjacent region line. In addition, a heavy line Ld2 is the left side segment line which represents the adjacent region adjacent to the left side of the irradiation avoidance region, and a heavy line Ld3 is the right side segment line which represents the adjacent region adjacent to the right side of the irradiation avoidance region. Thus, the irradiation reduction chips are LED chips from among the left side LED group 57 and the right side LED group 58 which irradiate the regions represented by the heavy line Ld2 and the heavy line Ld3.

The irradiation quantity Bn of one irradiation reduction chip among the irradiation reduction chips in the adjacent region is increased, within a range from the lower limit irradiation quantity (in the present embodiment, "0") to the standard irradiation quantity Bs, as the distance (more specifically, the shortest distance, and hereinafter also referred to as the "boundary distance") becomes longer between that irradiation reduction chip and an outer periphery of the irradiation avoidance region. More specifically, the irradiation quantity Bn of one irradiation reduction chip in the adjacent region is increased in proportion to the boundary distance. This outer periphery is a boundary between the irradiation avoidance region and the adjacent region which includes that irradiation reduction chip.

Each of lengths of the left side segment line and the right side segment line is also referred to as a "first distance" for convenience' sake. In other words, if the boundary distance of one of the LED chips is less than the first distance, that LED chip is the irradiation reduction chip.

Figure 7:
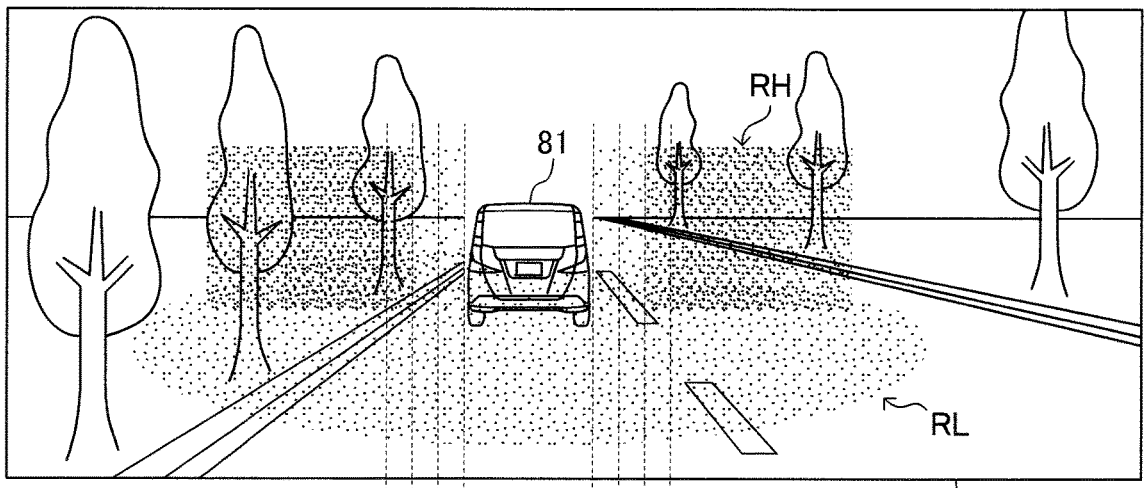
FIG. 7 is for describing irradiation sections and includes (A), (B), and (C), where (A) is an example of the front image, and (B) and (C) are histograms showing the irradiation states in a case where a wide area irradiation reduction processing is being executed.
Figure 7:
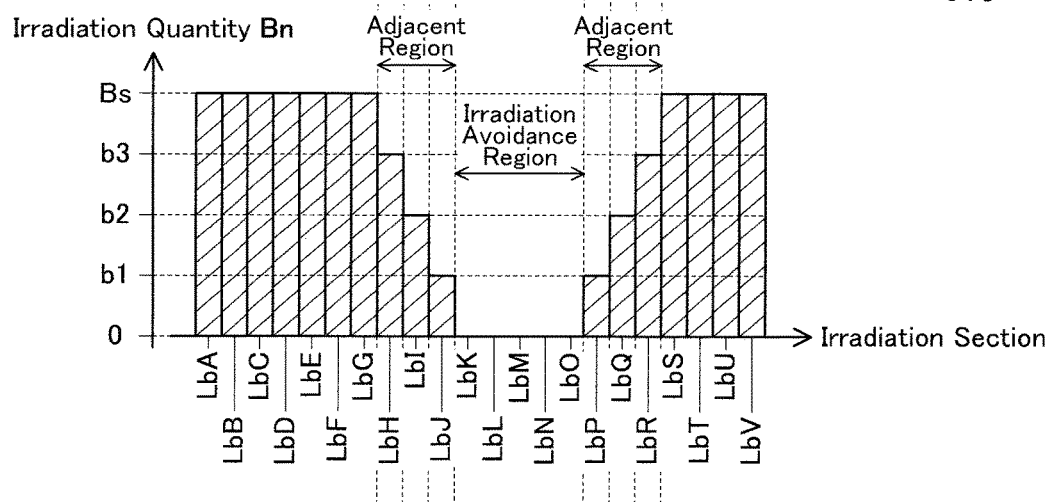
Figure 7:
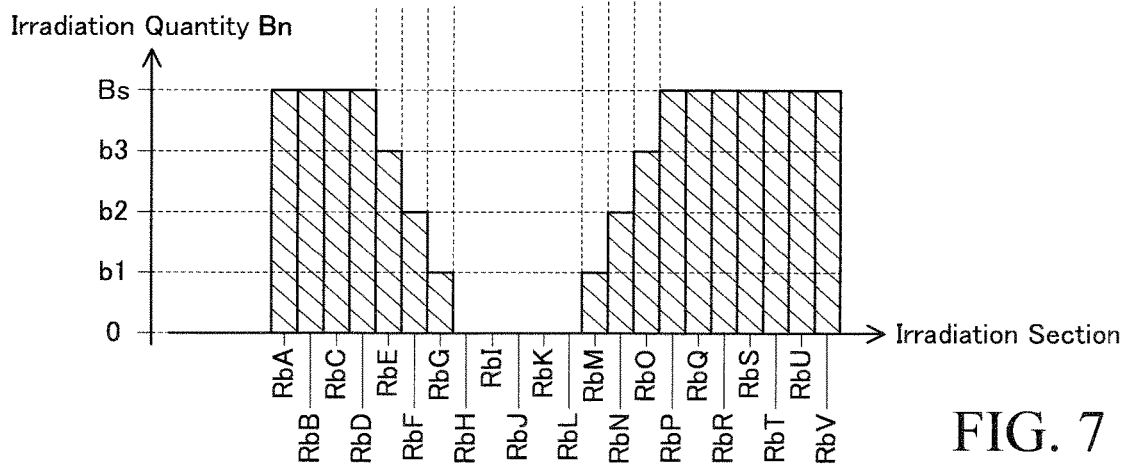

This will be described more specifically with reference to (A) to (C) of FIG. 7. An image 91c shown in (A) of FIG. 7 is an example of the front image. The image 91c is different from the image 91b described above (see (A) of FIG. 6) only in the irradiation quantities Bn of the high beam unit 54.

A histogram is shown in (B) of FIG. 7 which represents the irradiation state of the left high beam unit 55 (specifically, the left side LED group 57) in the case corresponding to the case shown in (A) of FIG. 7. A histogram is shown in (C) of FIG. 7 which represents the irradiation state of the right high beam unit 56 (specifically, the right side LED group 58) in the case corresponding to the case shown in (A) of FIG. 7.

In this example, the LED chips corresponding to the bin LbH to the bin LbJ and the LED chips corresponding to the bin LbP to the bin LbR in the histogram of (B) of FIG. 7 are the irradiation reduction chips. Namely, the left side LED 57H to the left side LED 57J, and the left side LED 57P to the left side LED 57R are the irradiation reduction chips. Similarly, the LED chips corresponding to the bin RbE to the bin RbG and the LED chips corresponding to the bin RbM to the bin RbO in the histogram of (C) of FIG. 7 are the irradiation reduction chips. Namely, the right side LED 58E to the right side LED 58G, and the right side LED 58M to the right side LED 58O are the irradiation reduction chips.

First, the irradiation quantity Bn of the irradiation reduction chips of the left high beam unit 55 corresponding to the adjacent region adjacent to the left side of the irradiation avoidance region (namely, the left side LED 57H to the left side LED 57J) will be described. The number of the LED chips corresponding to this adjacent region is "3." Thus, the irradiation quantity Bn of these LED chips increases in a stepwise manner by a "certain irradiation quantity equal to one-quarter of the standard irradiation quantity Bs" as the boundary distance increases in a stepwise manner.

More specifically, an irradiation quantity b1 is the irradiation quantity Bn of the left side LED 57J. The left side LED 57J corresponds to the irradiation section adjacent to the irradiation avoidance region. Thus, irradiation quantity b1 is equal to one-quarter of the standard irradiation quantity Bs (namely, b1=Bs/4). An irradiation quantity b2 is the irradiation quantity Bn of the left side LED 57I. The left side LED 57I is adjacent to the left side LED 57J, and the irradiation section of the left side LED 57I is farther from the irradiation avoidance region than that of the left side LED 57J. Thus, the irradiation quantity b2 is equal to two fourths (=½) of the standard irradiation quantity Bs (namely, b2=Bs/2).

In other words, since the boundary distance of the left side LED 57I is twice as long as the boundary distance of the left side LED 57J, the irradiation quantity Bn of the left side LED 57I (namely, the irradiation quantity b2) is twice as great as the irradiation quantity Bn of the left side LED 57J (namely, the irradiation quantity b1).

An irradiation quantity b3 is the irradiation quantity Bn of the left side LED 57H. The irradiation section of the left side LED 57H is adjacent to the left side LED 57I, and the irradiation section of the left side LED 57H is farther from the irradiation avoidance region than that of the left side LED 57I. Thus, the irradiation quantity b3 is equal to three fourths of the standard irradiation quantity Bs (namely, b3=Bs×3/4).

As understood from (8) of FIG. 7 and (C) of FIG. 7, the irradiation quantities Bn of each of the left side LED 57P, the right side LED 58G and the right side LED 58M is the irradiation quantity b1. In addition, the irradiation quantities Bn of each of the left side LED 57Q, the right side LED 58F and the right side LED 58N is the irradiation quantity b2. Furthermore, the irradiation quantities Bn of each of the left side LED 57R, the right side LED 58E and the right side LED 58O is the irradiation quantity b3.

A state realized through the wide area irradiation reduction processing described so far where the irradiation quantities Bn of irradiation stopping chips are made to be the lower limit irradiation quantity and the irradiation quantities Bn of the irradiation reduction chips are made to be less than the standard irradiation quantity Bs is sometimes referred to as a "first state" for convenience' sake. In addition, each of the irradiation quantities Bn of the irradiation reduction chips when the state (irradiation state) of the headlight 50 is the first state is sometimes referred to as a target irradiation quantity Bt. For example, the target irradiation quantity Bt of the left side LED 57J in the example described above is the irradiation quantity b1.

Incidentally, when two of the irradiation avoidance regions are present, there may be a case where one of the LED chips is an irradiation reduction chip corresponding to one of the irradiation avoidance region (region A) which is adjacent to the left side of the irradiation avoidance region, and that LED is also the irradiation reduction chip corresponding to the irradiation avoidance region (region B) which is adjacent to the right side of the irradiation avoidance region. In such a case, "the target irradiation quantities Bt determined on the basis of the positional relationship with the area A" or "the target irradiation quantity Bt determined on the basis of the positional relationship with the area B", whichever is smaller, is employed (adopted) as the target irradiation quantity Bt of that LED chip.

Figure 8:
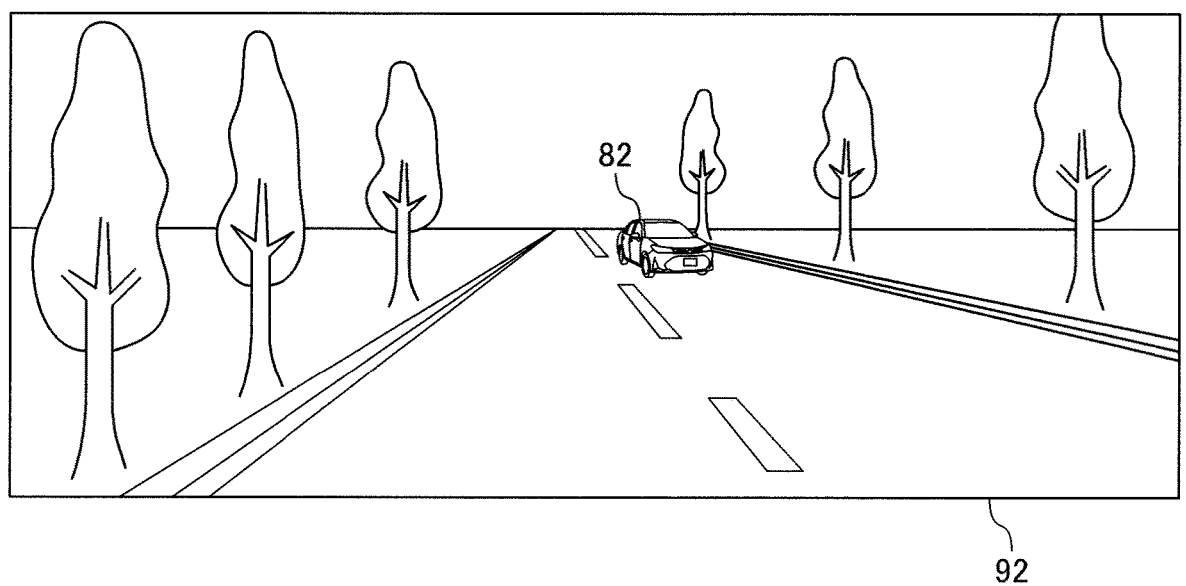
FIG. 8 is an example of the front image.

Next, another example of a case where the wide area irradiation reduction processing is executed will be described with reference to FIG. 8 and FIG. 9. An image 92 shown in FIG. 8 is an example of the front image. An other vehicle 82 shown in the image 92 is the irradiation avoidance object, since the headlight of the other vehicle 82 shown in the image 92 is on. In FIG. 8, graphical illustration of the low beam light distribution region and the high beam light distribution region is omitted.

Figure 9:
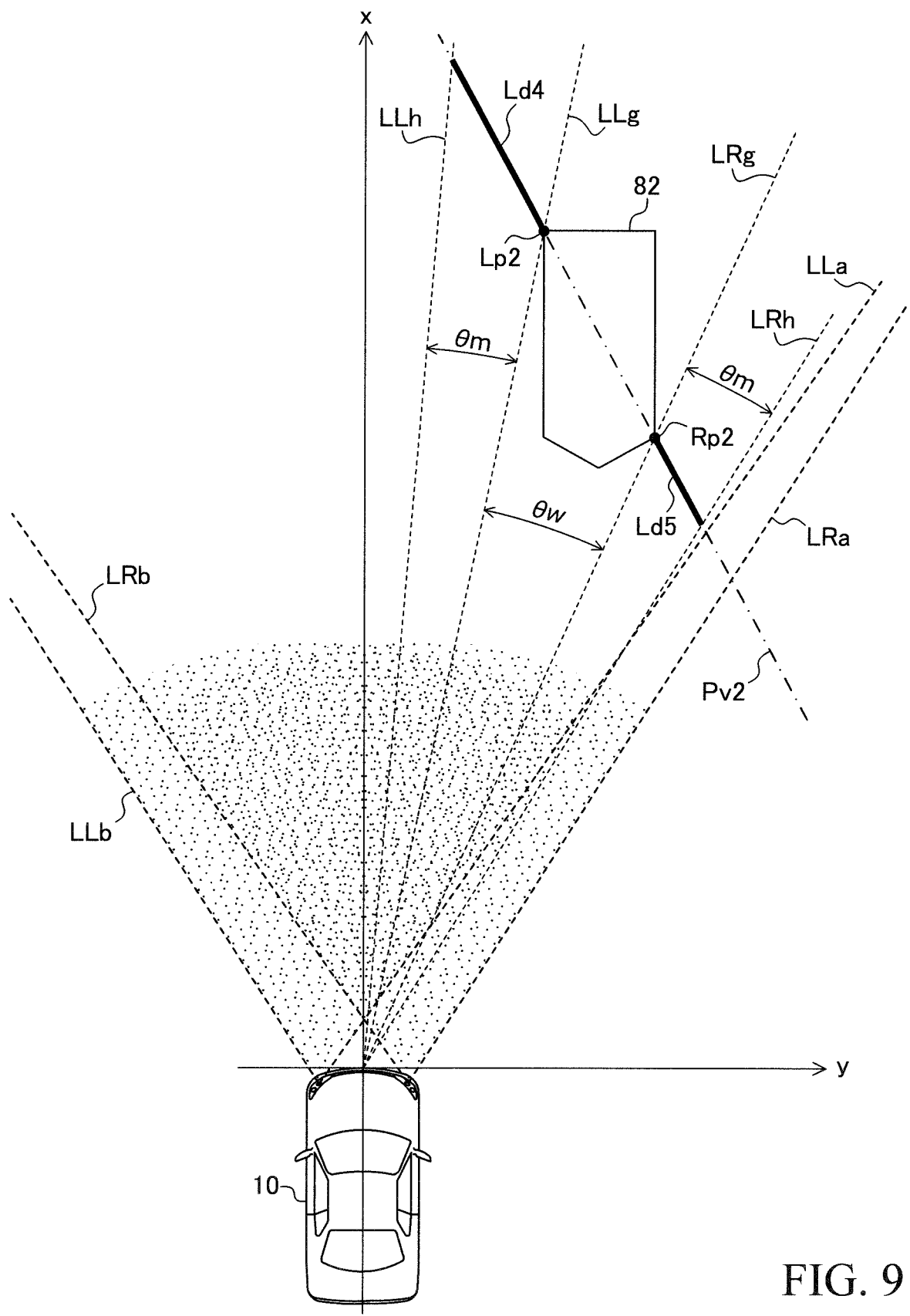
FIG. 9 is another plan view showing a region in which the irradiation quantity is reduced as a result of the dazzlement avoidance processing executed.

A planar view of the case illustrated in FIG. 8 is shown in FIG. 9. In FIG. 9, a point Lp2 is the left end of the other vehicle 82 and a point Rp2 is the right end of the other vehicle 82. Thus, the light distribution vertical plane in a planar view of this example is represented by a dashed-dotted line Pv2.

In addition, in FIG. 9, a broken line LLg is the left end straight line of the other vehicle 82, and a broken line LRg is the right end straight line of the other vehicle 82. Furthermore, in FIG. 9, a broken line LLh is the left side adjacent region line, and a broken line LRh is the right side adjacent region line. Thus, the adjacent region adjacent to the left side of the irradiation avoidance region (namely, the left side segment line) is represented by a heavy line Ld4, and the adjacent region adjacent to the right side of the irradiation avoidance region (namely, the right side segment line) is represented by a heavy line Ld5.

Therefore, among the left side LED group 57 and the right side LED group 58, the LED chips that can irradiate the region represented by the segment line from the point Lp2 to the point Rp2 are the irradiation stopping chips. In addition, among the left side LED group 57 and the right side LED group 58, the LED chips that can irradiate the region represented by each of the heavy line Ld4 and the heavy line Ld5 are the irradiation reduction chips.

(Dazzlement Avoidance Processing—Irradiation Quantity Gradual Reducing Control)

Next, "irradiation quantity gradual reducing control" will be described. The light control ECU 20 executes the irradiation quantity gradual reducing control when the driving state of the vehicle 10 is switched from the autonomous driving state to the manual driving state while the narrow area irradiation reduction processing is being executed. The irradiation quantity gradual reducing control is control for gradually reducing the irradiation quantity Bn of the irradiation reduction chips from the standard irradiation quantity Bs to the target irradiation quantity Bt over/for a predetermined irradiation quantity decreased time Td (also referred to as a "first transition time" for convenience' sake). Namely, when the irradiation quantity gradual reducing control is executed, the irradiation state of the headlight 50 transitions over the first transition time (gradually changes) from the second state to the first state.

Meanwhile, when the driving state of the vehicle 10 is switched from the manual driving state to the autonomous driving state while the wide area irradiation reduction processing is being executed, the light control ECU 20 increases the irradiation quantity Bn of the irradiation reduction chips to the standard irradiation quantity Bs promptly. Namely, in this case, the irradiation state of the headlight 50 quickly transitions in a short time (changes immediately) from the first state to the second state.

(Dazzlement Avoidance Processing—Specific Operation)

Next, specific operation of the CPU of the light control ECU 20 (hereinafter also referred to as "the CPU" for simplification) for controlling the irradiation states of the high beam unit 54 will be described. Notably, when either the low beam condition or the high beam condition is satisfied, the CPU executes an unillustrated routine for controlling the control circuit 61 so as to turn on (light up) the low beam unit 51.

Figure 10:
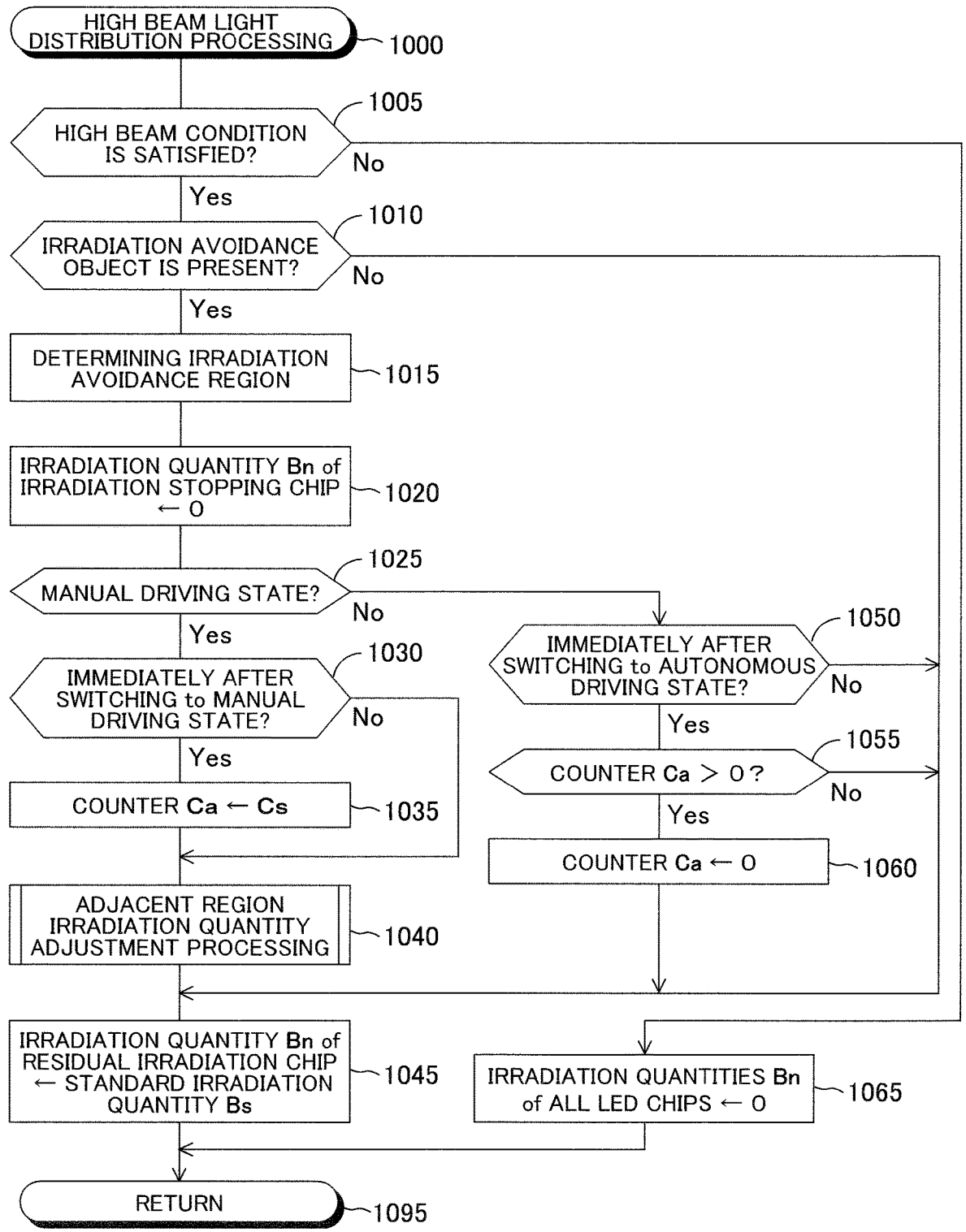
FIG. 10 is a flowchart representing a high beam light distribution processing routine executed by the present control apparatus.

The CPU executes a "high beam light distribution processing routine" represented by a flowchart shown in FIG. 10 every time the time interval ΔTc elapses. In the present routine, the CPU refers to a counter Ca having a counter initial value Cs. A product of the time interval ΔTc and the counter initial value Cs is equal to the irradiation quantity decreased time Td (namely, Td=ΔTc×Cs). As described later, the processing of the present routine is executed a number of times equal to the counter initial value Cs in a period from a start to a completion of the irradiation quantity gradual decrease control. The irradiation quantities Bn of the irradiation reduction chips is decreased little by little every time the processing of the present routine is executed.

When the CPU starts the irradiation quantity gradual decrease control, the CPU set the value of the counter Ca to the counter initial value Cs. When the irradiation quantity gradual decrease control is not executed, the value of the counter Ca is "0." The value of the counter Ca is set to "0" in an initialization routine (not shown) which is executed by the CPU when the light control ECU 20 is booted/turned on (namely, when a predetermined ON operation to an unillustrated ignition switch of the vehicle 10 is performed).

Therefore, when an appropriate timing has come, the CPU starts the process from step 1000 of FIG. 10 and proceeds to step 1005 so as to determine whether or not the high beam condition is satisfied.

(Case A)

It is now assumed that the high beam condition is satisfied and the irradiation avoidance object is not present.

According to this assumption, since the high beam condition is satisfied, the CPU makes a "Yes" determination in step 1005 and proceeds to step 1010 so as to determine whether or not the irradiation avoidance object is present. More specifically, the CPU determines whether or not the light control ECU 20 has received the other vehicle position information and the other vehicle lighting state information related to "an other vehicle which is in the high beam light distribution region and of which at least one of the headlight and the taillight is on" from the camera apparatus 40 in a period from a time point when the present routine was executed last time to the present time point.

According to the assumption described above, the irradiation avoidance object is not present, and thus, the CPU makes a "No" determination in step 1010 and proceeds to step 1045 directly so as to control the control circuit 61 such that the irradiation quantities Bn of the residual irradiation chips become equal to the standard irradiation quantity Bs. The residual irradiation chips are LED chips that are neither the irradiation stopping chips nor the irradiation reduction chips, among the LED chips included in the high beam unit 54.

According to the assumption described above, the irradiation avoidance object is not present, and thus, neither the irradiation stopping chip nor the irradiation reduction chip is present at the present time point. Therefore, all of the LED chips included in the high beam unit 54 are the residual irradiation chips in this case, and thus, the CPU controls the control circuit 61 such that the irradiation quantities Bn of all of the LED chips become equal to the standard irradiation quantity Bs. This processing for controlling the control circuit 61 such that the irradiation quantities Bn of the left side LED group 57 and the right side LED group 58 become equal to the standard irradiation quantity Bs, which is executed by the CPU when the high beam condition is satisfied and the irradiation avoidance object is not present, is sometimes referred to as a "basic irradiation processing" for convenience' sake.

Subsequently, the CPU proceeds to step 1095 so as to end the present routine.

(Case B)

It is assumed that the high beam condition is satisfied at the present time point, the present time point is immediately after the driving state of the vehicle 10 is switched from the autonomous driving state to the manual driving state, and the irradiation avoidance object is present.

In this case, the CPU makes a "Yes" determination in step 1010 and proceeds to step 1015 so as to determine/specify the irradiation avoidance region. Namely, the CPU determines the irradiation sections which overlap with the irradiation avoidance object and extracts the LED chips corresponding to the determined irradiation sections (namely, LED chips that can irradiate the irradiation avoidance object) as the irradiation stopping chips. If a plurality of the irradiation avoidance objects are present, the CPU determines the irradiation avoidance regions for each of those irradiation avoidance objects.

Subsequently, the CPU proceeds to step 1020 so as to control the control circuit 61 such that the irradiation quantities Bn of the irradiation stopping chips become equal to "0." Furthermore, the CPU proceeds to step 1025 so as to determine whether or not the driving state of the vehicle 10 is the manual driving state.

According to the assumption described above, the driving state of the vehicle 10 is the manual driving state, and thus, the CPU makes a "Yes" determination in step 1025 and proceeds to step 1030 so as to determine whether or not the present time point is immediately after the driving state of the vehicle 10 was switched to the manual driving state. More specifically, the CPU determines whether or not the present routine is being executed for the first time after the driving state of the vehicle 10 was switched from the autonomous driving state to the manual driving state.

According to the assumption described above, the present routine is being executed for the first time after the driving state of the vehicle 10 was switched from the autonomous driving state to the manual driving state, and thus, the CPU makes a "Yes" determination in step 1030 and proceeds to step 1035 so as to set the value of the counter Ca to the counter initial value Cs.

Subsequently, the CPU proceeds to step 1040 so as to execute an "adjacent region irradiation quantity adjustment processing routine" represented by a flowchart shown in FIG. 11. More specifically, the CPU starts the process from step 1100 of FIG. 11 and executes processes from step 1105 to step 1115 described below one after another, and then proceeds to step 1120.

Step 1105: the CPU determines/specifies the adjacent regions. Namely, the CPU determines the left end straight line, the right end straight line, the left side adjacent region line, and the right side adjacent region line, all corresponding to the irradiation avoidance object. In addition, the CPU extracts, as the irradiation reduction chips, the LED chips that can irradiate the adjacent regions as follows. Namely, the CPU extracts the LED chips corresponding to irradiation sections which overlap with the adjacent regions on the basis of these straight lines and positions of the left end and the right end of the irradiation avoidance object with respect to the vehicle 10. If a plurality of the irradiation avoidance objects are present, the CPU determines the adjacent regions for each of the irradiation avoidance objects.

Step 1110: the CPU selects one of the extracted irradiation reduction chips. In the description for the present routine, this selected irradiation reduction chip is also referred to as the "selected irradiation reduction chip."

Step 1115: the CPU obtains (figures out) the target irradiation quantity Bt of the selected irradiation reduction chip. Namely, the CPU determines the target irradiation quantity Bt of the selected irradiation reduction chip on the basis of the number of the irradiation sections corresponding to (constituting) the adjacent region, in which the selected irradiation reduction chip is included, and the boundary distance of the selected irradiation reduction chip.

If the selected irradiation reduction chip corresponds to two irradiation avoidance objects (namely, if the irradiation section corresponding to the selected irradiation reduction chip is included in both the irradiation avoidance region on the left side of that irradiation section and the irradiation avoidance region on the right side of that irradiation section), the CPU calculates/determines, for the selected irradiation reduction chip, the target irradiation quantity Bt corresponding to each of the two adjacent regions. In addition, the CPU obtains the smaller value among the two target irradiation quantities Bt as the target irradiation quantity Bt of that selected irradiation reduction chip.

In step 1120, the CPU determines whether or not the value of the counter Ca is greater than "0." Namely, the CPU determines whether the irradiation quantity gradual decrease control is not being executed. According to the assumption described above, the value of the counter Ca is equal to the counter initial value Cs, and thus, the CPU makes a "Yes" determination in step 1120 and proceeds to step 1125 so as to obtain the irradiation quantity Bn of the selected irradiation reduction chip at the present time point.

Subsequently, the CPU proceeds to step 1130 so as to determine whether or not the irradiation quantity Bn of the selected irradiation reduction chip at the present time point is greater than the target irradiation quantity Bt of the selected irradiation reduction chip. If the irradiation quantity Bn at the present time point is greater than the target irradiation quantity Bt, the CPU makes a "Yes" determination in step 1130 and proceeds to step 1135 so as to figure out an irradiation quantity differential $\Delta B$ by dividing a difference between the irradiation quantity Bn at the present time point and the target irradiation quantity Bt by the counter Ca (namely, $\Delta B=(Bn-Bt)/Ca$).

Furthermore, the CPU proceeds to step 1140 so as to determine whether or not the target irradiation quantity Bt is equal to or greater than a difference ($=Bn-\Delta B$) between the irradiation quantity Bn at the present time point and the irradiation quantity differential $\Delta B$. If the target irradiation quantity Bt is equal to or greater than the difference between the irradiation quantity Bn at the present time point and the irradiation quantity differential $\Delta B$, the CPU makes a "Yes" determination in step 1140 and proceeds to step 1145 so as to control the control circuit 61 such that the irradiation quantity Bn of the selected irradiation reduction chip decreases by irradiation quantity differential $\Delta B$. Subsequently, the CPU proceeds to step 1150.

In step 1150, the CPU determines whether or not the process described above has been executed for all of the irradiation reduction chips (namely, all of the irradiation reduction chips have been selected as the selected irradiation reduction chip respectively). If there is the irradiation reduction chip which the process has not been executed for, the CPU makes a "No" determination in step 1150 and proceeds to step 1110 so as to select one of the irradiation reduction chips which the process has not been executed for as the selected irradiation reduction chip.

Meanwhile, if the process described above has been executed for all of the irradiation reduction chips, the CPU makes a "Yes" determination in step 1150 and proceeds to step 1155 so as to determine whether or not the value of the counter Ca is greater than "0" by similar processing as step 1120.

According to the assumption described above, the value of the counter Ca is equal to the counter initial value Cs, and thus, the CPU makes a "Yes" determination in step 1155 and proceeds to step 1160 so as to decrease the value of the counter Ca by "1." Subsequently, the CPU proceeds to step 1195 so as to end the present routine and proceeds to step 1045 of FIG. 10.

It should be noted that if the irradiation quantity Bn of the selected irradiation reduction chip at the present time point is equal to or less than the target irradiation quantity Bt, the CPU makes a "No" determination in step 1130 and proceeds to step 1165 so as to control the control circuit 61 such that the irradiation quantity Bn of the selected irradiation reduction chip coincides with the target irradiation quantity Bt. Subsequently, the CPU proceeds to step 1150. Similarly, if the target irradiation quantity Bt is less than the difference between the irradiation quantity Bn at the present time point and the irradiation quantity differential $\Delta B$, the CPU makes a "No" determination in step 1140 and proceeds to step 1165.

The case where the CPU makes a "No" determination in step 1130 or step 1140 (namely, the case where the irradiation quantity Bn of the selected irradiation reduction chip is less than an expected value) may occur in a state where, for example, the irradiation stopping chip and/or the irradiation reduction chip corresponding to the irradiation avoidance object has changed from a certain LED chip to another one, while the irradiation quantity gradual decrease control is being executed. For example, the case may occur when a position (relative position) of the irradiation avoidance object with respect to the vehicle 10 has changed due to a lane change of the irradiation avoidance object and/or the vehicle 10.

In step 1045 shown in FIG. 10, the CPU controls the control circuit 61 such that the irradiation quantity Bn of the residual irradiation chips (namely, the LED chips that are neither the irradiation stopping chips nor the irradiation reduction chips, of which the irradiation quantity Bn have been controlled by the processing described above) becomes equal to the standard irradiation quantity Bs. Subsequently, the CPU proceeds to step 1095.

Figure 11:
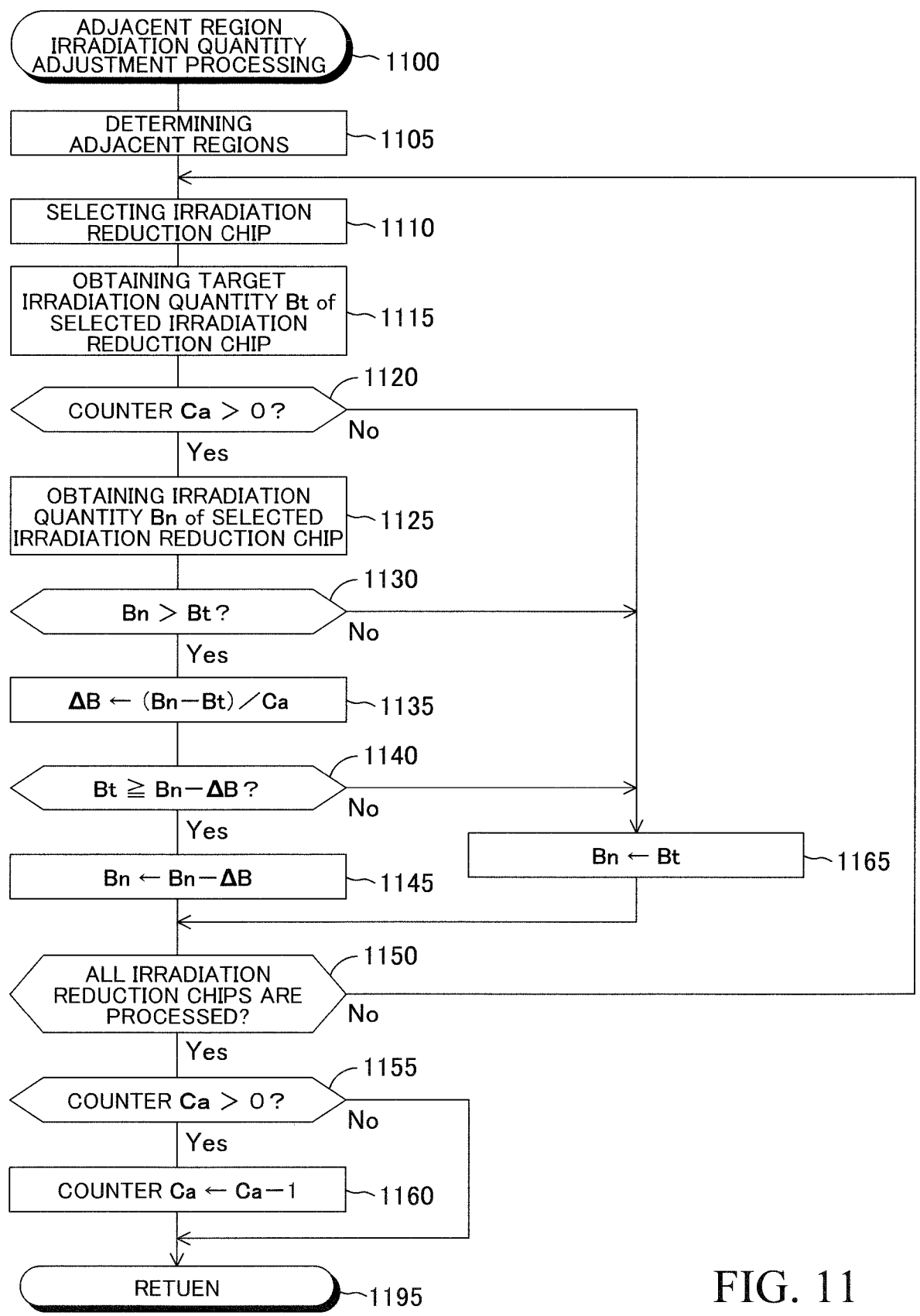
FIG. 11 is a flowchart representing an adjacent region irradiation quantity adjustment processing routine executed by the present control apparatus.

Thereafter, when the time interval $\Delta Tc$ elapses and the processing of the routine shown in FIG. 10 is started again, the CPU makes a "No" determination in step 1030 and directly proceeds to step 1040 so as to start the processing of the routine shown in FIG. 11. Therefore, the CPU decreases the irradiation quantity Bn of selected irradiation reduction chip by irradiation quantity differential $\Delta B$. Furthermore, the CPU decreases the value of the counter Ca by "1."

In addition, when the CPU executes the processing of the routines shown in FIG. 10 and FIG. 11 for the first time after the value of the counter Ca became equal to "1" as a result of repeated execution of the processing of the routines shown in FIG. 10 and FIG. 11, the irradiation quantity gradual decrease control is completed. Namely, at this time, the irradiation quantities Bn of all of the irradiation reduction chips is equal to the target irradiation quantities Bt obtained (figured out) for each of the irradiation reduction chips.

Thereafter, when the CPU executes the processing of the routines shown in FIG. 10 and FIG. 11 while the value of the counter Ca is equal to "0," the CPU makes a "No" determination in step 1120 and proceeds to step 1165. Namely, in this case, the CPU does not execute the irradiation quantity gradual decrease control and makes (lets) the irradiation quantities Bn of all of the irradiation reduction chips coincide with the target irradiation quantities Bt.

(Case C)

It is assumed that thereafter the processing of the routine shown in FIG. 10 is started immediately after the driving state of the vehicle 10 is switched from the manual driving state to the autonomous driving state.

In this case, the CPU makes a "No" determination in step 1025 and proceeds to step 1050 so as to determine whether or not the present time point is immediately after the driving state is switched to the autonomous driving state. Namely, the CPU determines whether or not the present routine is being executed for the first time after the driving state of the vehicle 10 has been switched from the manual driving state to the autonomous driving state.

According to the assumption described above, the present routine is being executed for the first time after the driving state of the vehicle 10 has been switched from the manual driving state to the autonomous driving state, and thus, the CPU makes a "Yes" determination in step 1050 and proceeds to step 1055.

In step 1055, the CPU determines whether or not the value of the counter Ca is greater than "0" by similar processing as step 1120. Namely, the CPU determines whether or not the driving state of the vehicle 10 has been switched from the manual driving state to the autonomous driving state while the irradiation quantity gradual decrease control is being executed.

If the value of the counter Ca is greater than "0," the CPU makes a "Yes" determination in step 1055 and proceeds to step 1060 so as to set the value of the counter Ca to "0." Subsequently, the CPU proceeds to step 1045.

Meanwhile, if the value of the counter Ca is "0," the CPU makes a "No" determination in step 1055 and proceeds to step 1045 directly.

Therefore, in this case, the LED chips other than the irradiation stopping chips are treated as the residual irradiation chips, and thus, the irradiation quantities Bn of these LED chips become equal to the standard irradiation quantity Bs. Namely, the narrow area irradiation reduction processing is executed.

Thereafter, the processing of the present routine is started again, the CPU makes a "No" determination in step 1050 and proceeds to step 1045 directly.

Notably, in a case where the determination condition of step 1005 is not satisfied (namely, the high beam condition is not satisfied), the CPU makes a "No" determination in step 1005 and proceeds to step 1065 so as to control the control circuit 61 such that the irradiation quantities Bn of all of the LED chips become equal to "0." Subsequently, the CPU proceeds to step 1095. Namely, in this case, the high beam unit 54 is turned off.

In addition, in a case where the determination condition of step 1155 is not satisfied (namely, the routine shown in FIG. 11 is being executed when the irradiation quantity gradual decrease control is not executed), the CPU makes a "No" determination in step 1155 and proceeds to step 1195 directly.

Modification of Embodiment

Next, a modification of the embodiment (the present modified apparatus) will be described. A light control ECU 21 according to the present modified apparatus is different from the light control ECU 20 according to the present control apparatus described above only in deduction (decrease) amounts of the irradiation quantities Bn of each of the left side LED group 57 and the right side LED group 58 when the dazzlement avoidance processing is executed.

Figure 12:
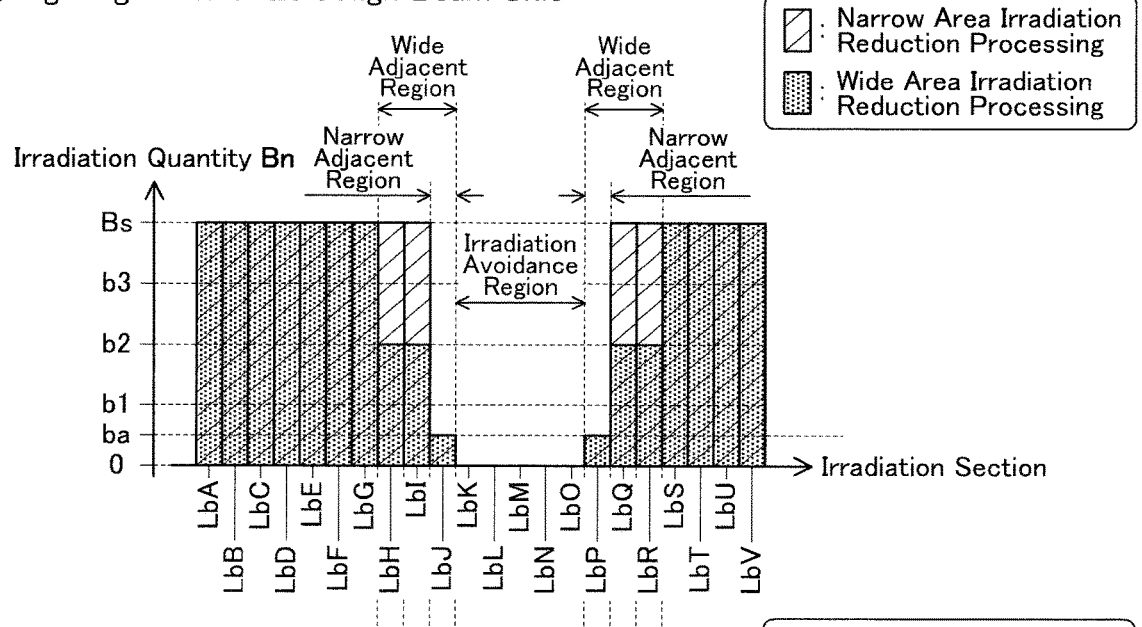
FIG. 12 includes (A) and (B) which are histograms showing the irradiation states in a case where the dazzlement avoidance processing is being executed by the present control apparatus according to a modification of the embodiment.
Figure 12:
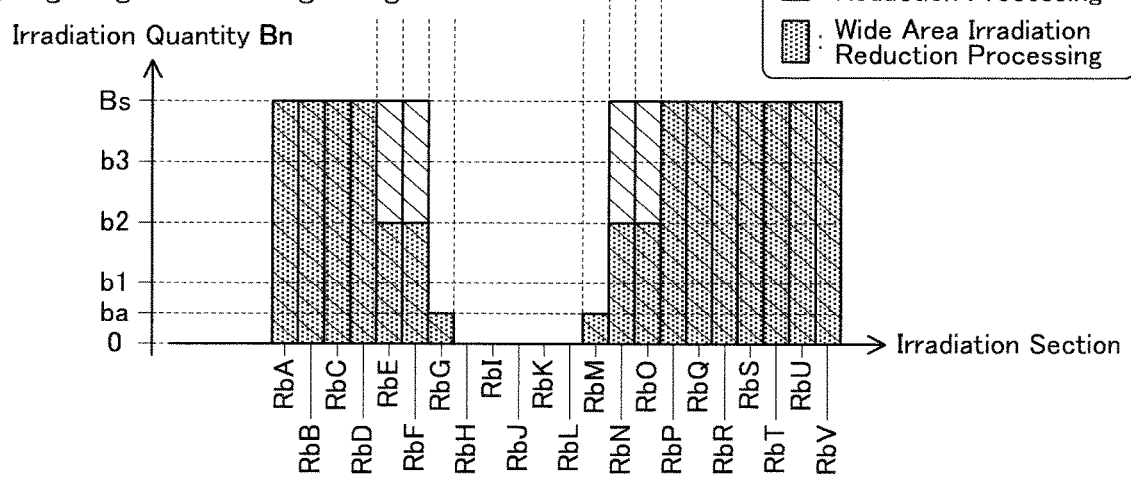

A histogram is shown in (A) of FIG. 12 which represents the irradiation state of the left high beam unit 55 (specifically, the left side LED group 57) in the case where the other vehicle 81 shown in FIG. 3 is present. A histogram is shown in (B) of FIG. 12 which represents the irradiation state of the right high beam unit 56 (specifically, the right side LED group 58) in the same case as the (A) of FIG. 12.

In this case, the left side LED 57K to the left side LED 57O and the right side LED 58H to the right side LED 58L are the irradiation stopping chips in common with the example of (B) of FIG. 6 and (C) of FIG. 6. Furthermore, when the light control ECU 21 executes the wide area irradiation reduction processing, the left side LED 57H to the left side LED 57J, the left side LED 57P to the left side LED 57R, the right side LED 58E to the right side LED 58G, and the right side LED 58M to the right side LED 58O are the irradiation reduction chip in common with the example of (B) of FIG. 7 and (C) of FIG. 7.

As understood from (A) of FIG. 12 and (B) of FIG. 12, the light control ECU 21 executes, as the narrow area irradiation reduction processing, a processing for setting the irradiation quantities Bn of the irradiation stopping chips to the lower limit irradiation quantity (for realizing the irradiation avoidance state), and of making (letting) the irradiation quantities Bn of the LED chips (adjacent chips) that correspond to the irradiation sections adjacent to the irradiation avoidance region become equal to (coincide with) a predetermined irradiation quantity ba which is less than the standard irradiation quantity Bs.

In the present modification, the left side LED 57K, the left side LED 57P, the right side LED 58G and the right side LED 58M are the adjacent chips. In addition, in the present modification, the irradiation quantity ba is less than the irradiation quantity b1.

A region, formed by a set of the irradiation sections, which is adjacent to the irradiation avoidance region and to which the irradiation quantity Bn of LED chip(s) corresponding is decreased from the standard irradiation quantity Bs is also referred to as a "narrow adjacent region" for convenience' sake. In the present modification, each of the narrow adjacent regions is formed by only one irradiation section (namely, the irradiation section corresponding to the adjacent chip).

The boundary distance of the adjacent chip is referred to as a "second distance" for convenience' sake. The second state of the present modification is a state in which the following two state are both realized; the irradiation avoidance state, and a state in which the irradiation quantities Bn of the narrow adjacent regions (namely, the adjacent chips) are the irradiation quantity ba.

Meanwhile, the light control ECU 21 executes, as the wide area irradiation reduction processing, processing for making (letting) the irradiation quantities Bn of the adjacent chips coincide with the irradiation quantity ba and making (letting) the irradiation quantities Bn of the irradiation reduction chips other than the adjacent chips coincide with the irradiation quantity b2.

As having been described above, according to the present assistance apparatus and the present modified apparatus, irradiation to the irradiation avoidance object by the high beam unit 54 is avoided (prohibited) through the execution of the dazzlement avoidance processing. In addition, when the driving state of the vehicle 10 is the manual driving state, the brightness boundaries is made unclear (blurred). This prevents the driver of the vehicle 10 from feeling a sense of strangeness due to the appearance of the irradiation avoidance region. In addition, when the driving state of the vehicle 10 is the autonomous driving state, the irradiation deduction amount of the high beam unit 54 become smaller as compared with a case where the driving state is the manual driving state.

Furthermore, the irradiation quantity gradual decrease control starts to be executed when/after the driving state of the vehicle 10 is switched from the autonomous driving state to the manual driving state while the narrow area irradiation reduction processing is being executed. This prevents the driver from feeling a sense of strangeness due to a quick (rapid/sudden) change of the brightness boundaries. Meanwhile, when the driving state of the vehicle 10 is switched from the manual driving state to the autonomous driving state while the wide area irradiation reduction processing is being executed, the irradiation deduction amount decreases quickly (immediately).

The embodiment of the vehicle head light control apparatus (namely, the present assistance apparatus and the present modified apparatus) according to the present disclosure has been described; however, the present disclosure is not limited to the above-described embodiments, and various modifications are possible without departing from the scope of the disclosure. For example, the high beam condition according to the present embodiment is satisfied when the operating states of both the lamp switch 62 and the high beam switch 63 are the ON state. However, the high beam condition may be a different condition from this. For example, the high beam condition may be satisfied when the operating state of the lamp switch 62 is an AUTO state and brightness (peripheral brightness) around the vehicle 10 detected by a brightness sensor is less than a predetermined threshold. In this case, the AUTO state may be included as the operating state of the lamp switch 62 in addition to the OFF state of the lamp switch 62 and the ON state of the lamp switch 62, and the brightness sensor is equipped with the vehicle 10 for detecting the peripheral brightness.

In addition, the irradiation avoidance object according to the present embodiment is an other vehicle (lighting other vehicle) of which at least one of a headlight and a taillight is on. However, the irradiation avoidance object may be an object (for example, a bicycle, a motorcycle and a pedestrian) different from the lighting other vehicle. Furthermore, the irradiation avoidance object may be an occupant (namely, a person(s) including a driver) on/in the lighting other vehicle instead of the lighting other vehicle itself.

In addition, in the present embodiment, the irradiation quantity Bn of each of the irradiation sections is controlled by the PWM light control for each of the LED chips (namely, each of the left side LED group 57 and each of the right side LED group 58). However, the irradiation quantity Bn of each of the irradiation sections may be controlled by a different method from this. For example, the irradiation quantity Bn of each of the irradiation sections may be controlled by a light shield mechanism which is arranged at each of the LED chips. In this case, the control circuit 61 adjust a light transmittance of the light shield mechanism so as to control the irradiation quantity Bn.

In addition, a plurality of the LED chips according to the present embodiment are arranged in line on each of the substrate 55a and the substrate 56a. However, a plurality of the LED chips may be arranged in a matrix of m rows and n columns. In this case, the high beam light distribution region is represented as a set (group) of the irradiation sections on the light distribution vertical plane in a matrix (grid) fashion.

Figure 13:
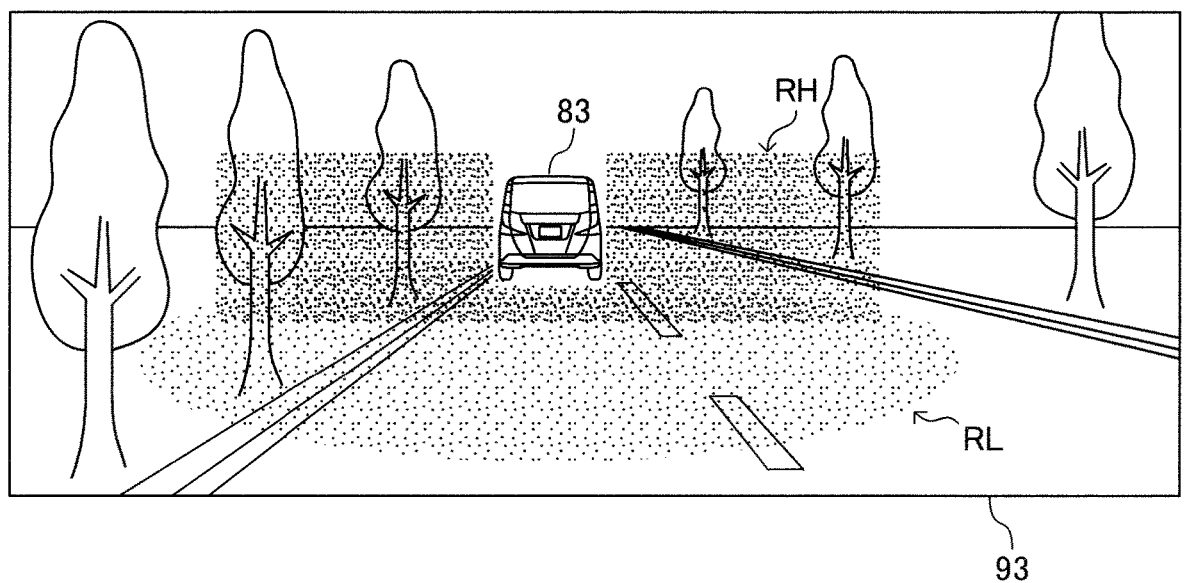
FIG. 13 is an example of the front image.

In such a configuration, when the narrow area irradiation reduction processing is executed while an other vehicle 83 contained in an image 93 shown in FIG. 13 as an example of the front image is present as the irradiation avoidance object, the light control ECU 20 may treat, as the residual irradiation chips, the LED chips which irradiate a region under/below the other vehicle 83 on the front image. Namely, a part of the high beam light distribution region under/below the irradiation avoidance object may be excluded from the irradiation avoidance region. Meanwhile, in this case, when the wide area irradiation reduction processing is executed, the light control ECU 20 may treat, as the wide adjacent region, a region adjacent on the bottom side of the irradiation avoidance region, in addition to the regions adjacent on the left side and the right side of the irradiation avoidance region. Furthermore, in this case, the target irradiation quantity Bt of each of the irradiation reduction chips becomes larger as the boundary distance increases.

In addition, the first distance according to the present embodiment is determined on the basis of the region angle θw of the irradiation avoidance object and the constant α. In other words, the number of the irradiation reduction chips included in the wide adjacent region changes (varies) in accordance with a size of the irradiation avoidance object and a distance to that irradiation avoidance object. However, the first distance may be a predetermined constant which is a number of the irradiation sections included in the wide adjacent region. For example, the number of the irradiation sections included in the wide adjacent region may be set to be "3" in advance. In this case, the first distance is equal to a length of the three irradiation sections adjacent to each other in the width direction of the vehicle 10.

In addition, the narrow adjacent region according to the present modified apparatus consists from the adjacent chip. Namely, the number of the irradiation sections included in the narrow adjacent region has been set to be "1" in advance. However, the narrow adjacent region may include the LED chip other than the adjacent chip. For example, the narrow adjacent region may be determined in the same manner as the wide adjacent region on the basis of an adjacent region angle θn which is figured out by multiplying the region angle θw of the irradiation avoidance object by a predetermined constant β (namely, θn=ρ×θw). In this case, the constant β is smaller than the constant α (namely, 0<β<α). Therefore, in this case, the second distance is determined on the basis of the region angle θw of the irradiation avoidance object and the constant β, and the narrow adjacent region will not be larger than the wide adjacent region. Furthermore, in this case, the irradiation quantity Bn of the LED chips corresponding to the narrow adjacent region becomes larger as the boundary distance increases.

In addition, the light control ECU 20 according to the present embodiment quickly changes the irradiation state of the headlight 50 from the first state to the second state when the driving state of the vehicle 10 is switched from the manual driving state to the autonomous driving state while the wide area irradiation reduction processing is being executed. However, when the driving state of the vehicle 10 is switched from the manual driving state to the autonomous driving state while the wide area irradiation reduction processing is being executed, the light control ECU 20 may gradually change the irradiation state of the headlight 50 from the first state to the second state over/for a predetermined transition time Tf (also referred to as a "second transition time" for convenience' sake) which is shorter than the irradiation quantity decreased time Td.

In addition, in the present embodiment, the time interval at which the camera apparatus 40 repeatedly executes the processing for detecting an other vehicle (namely, the irradiation avoidance object) is the time interval ΔTc. On the other hands, the time interval at which the light control ECU 20 repeatedly executes the processing for gradually reducing the irradiation quantity Bn of the irradiation reduction chips by the irradiation quantity gradual decrease control is the time interval ΔTc, too. However, these time intervals may be different from each other.

In addition, in the present embodiment, the camera apparatus 40 (specifically, the image obtaining section 41) is utilized for detecting the irradiation avoidance object. However, a sensor apparatus (for example, a millimeter wave radar apparatus and a LIDAR (Laser Imaging Detection and Ranging) apparatus) different from the camera apparatus 40 may be utilized for detecting the irradiation avoidance object.

In addition, the light control ECU 20 according to the present embodiment executes the irradiation quantity gradual decrease control when the driving state of the vehicle 10 is switched from the autonomous driving state to the manual driving state. However, the light control ECU 20 may be configured to execute, when the irradiation avoidance object is newly detected while the driving state of the vehicle 10 is the manual driving state, the irradiation quantity gradual decrease control for the detected irradiation avoidance object.

In addition, the lower limit irradiation quantity according to the present embodiment is "0." However, the lower limit irradiation quantity may be a lighting amount (for example, a very small lighting amount compared to the standard irradiation quantity Bs) different from "0."

In addition, in the present embodiment, the standard irradiation quantities Bs of each of the irradiation sections are equal to each other. However, the standard irradiation quantities Bs may be different for each of the irradiation sections. For example, the standard irradiation quantities Bs of the irradiation sections which are present just in a frontward direction of the vehicle 10 and present approximately in the frontward direction may be set to a larger value as compared with those of the other irradiation sections.

Furthermore, the light control ECU 20 may be configured to repeatedly receive the turning angle of the vehicle 10 from the drive control ECU 30 and change (vary) the standard irradiation quantity Bs in accordance with the received turning angle. In this case, for example, when 10 is making a right turn, the light control ECU 20 may set the standard irradiation quantity Bs of the irradiation section in a right front direction of the vehicle 10 to a larger value as compared with those of the other irradiation sections.

What is claimed is:

1. A vehicle head light control apparatus comprising:
    a headlight including a lighting apparatus configured to irradiate an irradiation region in front of a vehicle, said irradiation region being a set of irradiation sections adjacent to each other, and configured to vary irradiation quantity for each of said irradiation sections, said irradiation quantity being a lighting amount given to said irradiation section;
    a sensor device configured to detect, as an irradiation avoidance object, an object that is present in said irradiation region and that should is not be irradiated by said lighting apparatus; and
    a control unit implemented by at least one programmed processor and configured to:
    determine whether or not a predetermined irradiation condition is satisfied;
        execute a basic irradiation processing for adjusting an irradiation state such that each of said irradiation quantities is equal to a predetermined standard irradiation quantity when said irradiation condition is satisfied and said irradiation avoidance object is not detected; and
        execute, when said irradiation condition is satisfied and said irradiation avoidance object is detected, a dazzlement avoidance processing for adjusting said irradiation state to achieve an irradiation avoidance state where said irradiation quantity of said irradiation section overlapping with said irradiation avoidance object is equal to a predetermined lower limit irradiation quantity which is lower than said standard irradiation quantity;
    wherein
        said control unit is configured to:
            determine whether a driving state of said vehicle is a manual driving state or an autonomous driving state, said manual driving state being a state where a travelling state of said vehicle is controlled in accordance with driving operation by a driver of said vehicle, and said autonomous driving state being a state where said travelling state is controlled without said driving operation;
            execute, as said dazzlement avoidance processing, a processing for achieving a first state when said driving state is said manual driving state, said first state being a state where both said irradiation avoidance state and a first specific state are realized, said first specific state being a state where said irradiation quantities of said irradiation sections included in a wide adjacent region decreases within a range from said lower limit irradiation quantity to said standard irradiation quantity, as a boundary distance becomes smaller, said boundary distance being a shortest distance from an outer periphery of an irradiation avoidance region that is a set of said irradiation sections overlapping with said irradiation avoidance object, said wide adjacent region being a region that is within said irradiation region under said irradiation avoidance state, adjacent to said irradiation avoidance region and has said boundary distances smaller than a predetermined first distance; and
            execute, as said dazzlement avoidance processing, a processing for achieving a second state when said driving state is said autonomous driving state, said second state being one of a state where said irradiation avoidance state is realized and a state where both said irradiation avoidance state and a second specific state are realized, said second specific state being a state where said irradiation quantities of said irradiation sections included in a narrow adjacent region decreases within a range from said lower limit irradiation quantity to said standard irradiation quantity, as said boundary distance becomes smaller, said narrow adjacent region being a region that is within said irradiation region under said irradiation avoidance state, adjacent to said irradiation avoidance region, and has said boundary distances smaller than a predetermined second distance which is smaller than said first distance.

2. The vehicle head light control apparatus according to claim 1, wherein
said control unit is configured to start, when said driving state is switched from said autonomous driving state to said manual driving state while said second state has been realized as a result of said dazzlement avoidance processing, a processing for adjusting said irradiation state such that said irradiation state is gradually changed from said second state to said first state over a predetermined first transition time.

3. The vehicle head light control apparatus according to claim 2, wherein
said control unit is configured to start, when said driving state is switched from said manual driving state to said autonomous driving state while said first state has been realized as a result of said dazzlement avoidance processing, one of a processing for adjusting said irradiation state such that said irradiation state is gradually changed from said first state to said second state over a predetermined second transition time which is shorter than said first transition time, and a processing for adjusting said irradiation state such that said irradiation state is immediately changed from said first state to said second state.

4. The vehicle head light control apparatus according to claim 1, wherein
said lighting apparatus is configured such that said irradiation sections are arranged in line in front of said vehicle in a width direction of said vehicle.

* * * * *